(12) United States Patent
Watanabe et al.

(10) Patent No.: US 9,099,690 B2
(45) Date of Patent: Aug. 4, 2015

(54) METALLIC SEPARATOR FOR FUEL CELLS AND METHOD OF MANUFACTURING THE METALLIC SEPARATOR

(75) Inventors: Masahiro Watanabe, Kofu (JP); Hiroyuki Uchida, Kofu (JP); Hisao Yamashita, Kofu (JP); Kenji Miyatake, Kofu (JP)

(73) Assignee: University of Yamanashi, Kofu-shi (JP)

( * ) Notice: Subject to any disclaimer, the term of this patent is extended or adjusted under 35 U.S.C. 154(b) by 1493 days.

(21) Appl. No.: 11/922,321

(22) PCT Filed: Jun. 16, 2006

(86) PCT No.: PCT/JP2006/312555
§ 371 (c)(1),
(2), (4) Date: Feb. 18, 2009

(87) PCT Pub. No.: WO2006/135108
PCT Pub. Date: Dec. 21, 2006

(65) Prior Publication Data
US 2009/0214926 A1 Aug. 27, 2009

(30) Foreign Application Priority Data
Jun. 17, 2005 (JP) .................................. 2005-178036

(51) Int. Cl.
*H01M 8/02* (2006.01)

(52) U.S. Cl.
CPC ............ *H01M 8/0206* (2013.01); *H01M 8/021* (2013.01); *H01M 8/0228* (2013.01); *H01M 8/0234* (2013.01); *H01M 8/0239* (2013.01); *H01M 8/0243* (2013.01); *H01M 8/0254* (2013.01); *H01M 8/0267* (2013.01); *Y02E 60/50* (2013.01)

(58) Field of Classification Search
None
See application file for complete search history.

(56) References Cited

U.S. PATENT DOCUMENTS

| 4,781,996 A | 11/1988 | Toriya et al. |
| 2001/0028974 A1 | 10/2001 | Nakata et al. |
| 2002/0045086 A1 | 4/2002 | Tsuji et al. |
| 2002/0132152 A1 | 9/2002 | Saito et al. |
| 2003/0235711 A1 | 12/2003 | Seido et al. |
| 2005/0221158 A1 | 10/2005 | Yamauchi et al. |

FOREIGN PATENT DOCUMENTS

| DE | 19961496 A1 | 7/2000 |
| JP | 9-245820 A | 9/1997 |

(Continued)

OTHER PUBLICATIONS

English machine translation of Hiroshi JP 2003-272659.*

(Continued)

*Primary Examiner* — Sarah A Slifka
(74) *Attorney, Agent, or Firm* — Birch, Stewart, Kolasch & Birch, LLP

(57) ABSTRACT

A metallic separator for fuel cells having a metal plate, an electroconductive coating layer covering at least a surface in front and back surfaces of the metal plate which contacts a raw material and/or a reaction product, and an electroconductive channel-forming member disposed on a surface of the coating layer and forming a channel for the raw material and/or the reaction product and/or a channel for a cooling medium for cooling. A surface layer on the metal plate has a tensile residual stress within such a range that no stress-corrosion cracking occurs.

8 Claims, 10 Drawing Sheets

(56) References Cited

FOREIGN PATENT DOCUMENTS

| | | |
|---|---|---|
| JP | 2000-133282 A | 5/2000 |
| JP | 2000-243408 A | 9/2000 |
| JP | 2000-299117 A | 10/2000 |
| JP | 2001-351645 A | 12/2001 |
| JP | 2002-042828 A | 2/2002 |
| JP | 2002-063914 A | 2/2002 |
| JP | 2002-151097 A | 5/2002 |
| JP | 2003-268567 A | 9/2003 |
| JP | 2003-272659 A | 9/2003 |
| JP | 2003-317733 A | 11/2003 |
| JP | 2004-146247 A | 5/2004 |
| JP | 2005-7446 A | 1/2005 |
| JP | 2005-32591 A | 2/2005 |
| JP | 2005-50584 A | 2/2005 |
| JP | 2005-78981 A | 3/2005 |
| JP | 2005-100697 A | 4/2005 |
| JP | 2005-100813 A | 4/2005 |
| JP | 2005-123160 A | 5/2005 |
| JP | 2005-294155 A | 10/2005 |
| WO | WO-2005/029623 A2 | 3/2005 |

OTHER PUBLICATIONS

Kitta et al., "Metal separators coated with carbon/resin composite layers for PEFCs," Electrochimica Acta, Elsevier Science Publishers, Barking, GB, vol. 53, No. 4, Oct. 30, 2007, pp. 2025-2033, XP022322058.

English translation of the Written Opinion of the International Preliminary Examining Authority and Written Opinion of the International Searching Authority (Forms PCT/IPEA/408 and PCT/ISA/237).

Extended European Search Report dated Jul. 30, 2009 for corresponding Application No. 06767205.5.

* cited by examiner

FIGURE 7(a)
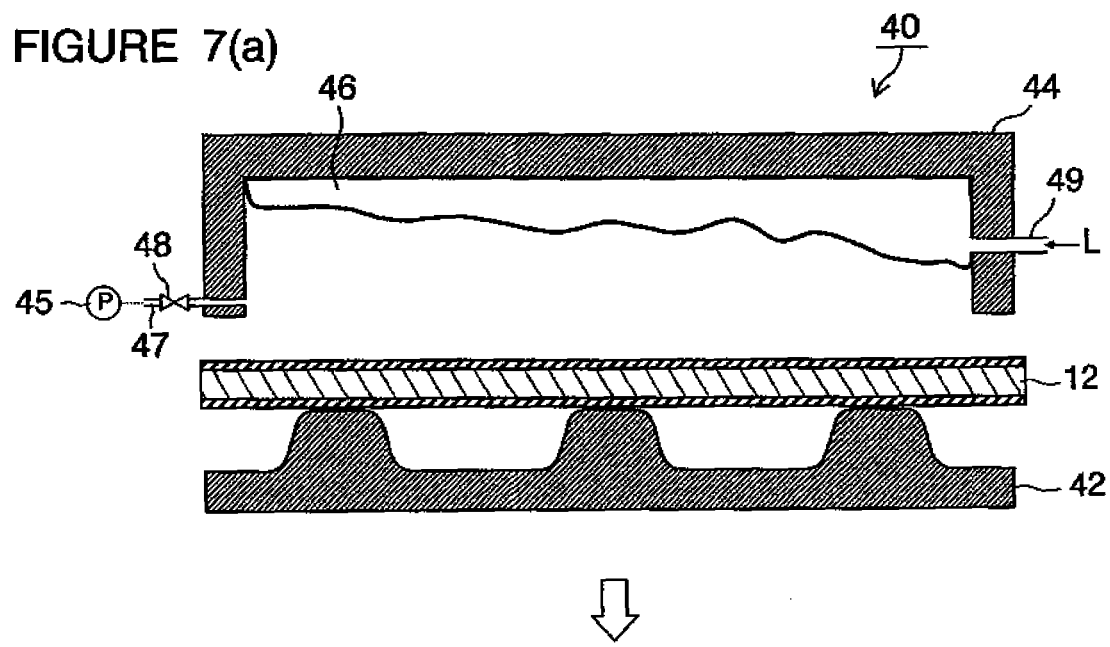
FIGURE 7(b)
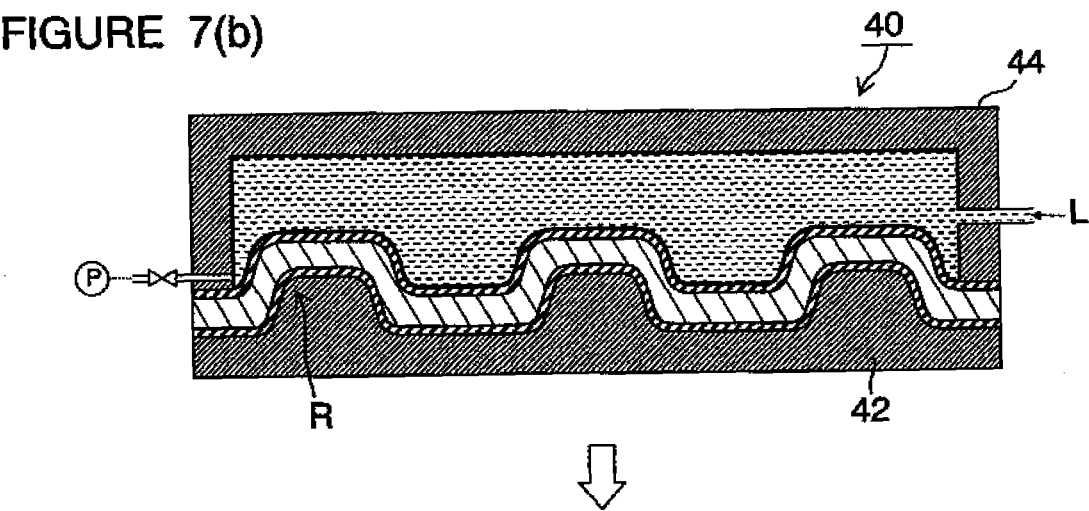
FIGURE 7(c)
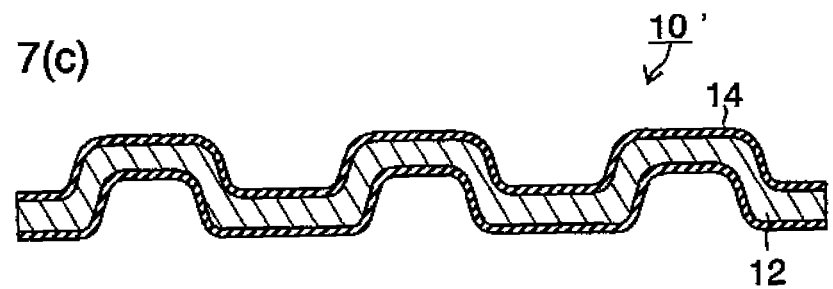

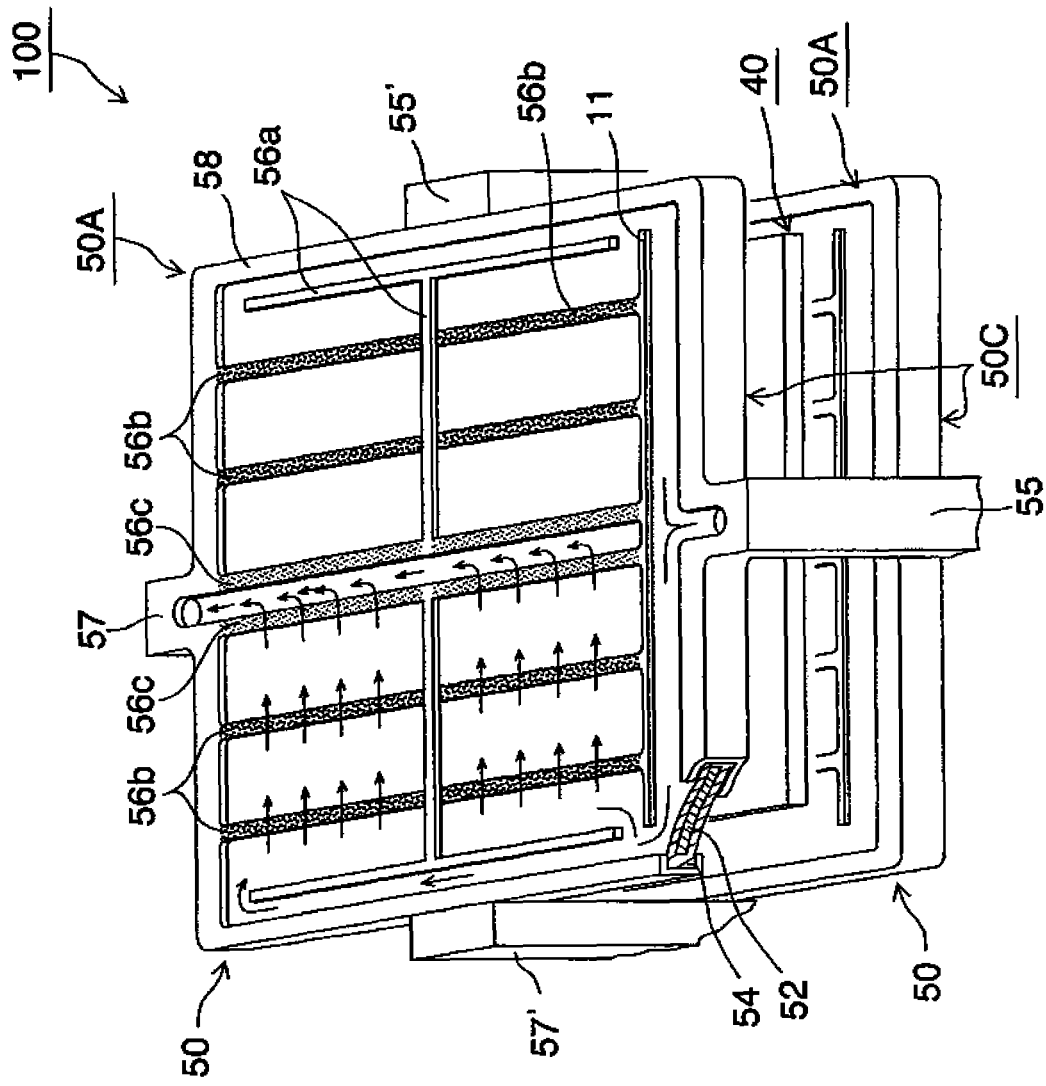

METALLIC SEPARATOR FOR FUEL CELLS AND METHOD OF MANUFACTURING THE METALLIC SEPARATOR

TECHNICAL FIELD

The present invention relates to a metallic separator for fuel cells and a method of manufacturing the metallic separator and, more particularly, to a metallic separator suitable for stacked fuel cells using a polymer electrolyte membrane, a method of manufacturing the metallic separator, and a fuel cell. The present application is accompanied with claim of priority under the Paris convention based on Japanese Patent Application No. 2005-178036 based on the Japanese Patent Law.

BACKGROUND ART

A polymer electrolyte fuel cell (PEFC) is a device for obtaining electric energy by causing a hydrogen gas provided as a fuel and oxygen provided as an oxidizer to react with each other. A unit cell formed as this fuel cell is constituted by a membrane electrode assembly (MEA) which is formed of a pair of porous electrodes (porous supporting layer+catalyst layer) are opposed to each other with a polymer electrolyte membrane interposed therebetween, and which is sandwiched between a pair of separators in each of which a channel for supplying a fuel or an oxidizer is formed. Unit cells formed in this way are stacked to be used as a stacked-cell battery. Various uses of such fuel cells as power sources for use on vehicles, fixed use and portable/mobile use at an operating temperature of about 80° C. are being expected. The electrode reaction is shown below.

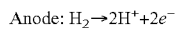

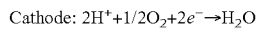                               (Formula 1)

At the anode (fuel pole), a fuel such as hydrogen or alcohol is oxidized to produce hydrogen ions (protons). The produced protons move in the electrolyte membrane toward the cathode (oxygen pole or air pole) together with water, while electrons reach the cathode via an external circuit. At the cathode, water is produced by reduction reaction of electrons and oxygen. At this time, the protons produced at the anode move with water molecules through the electrolyte membrane and, therefore, the electrolyte membrane is maintained in a wet state. The separator is exposed to a strong acid solution atmosphere at a temperature from room temperature to 100° C. because it is in contact with the porous supporting layer (carbon paper or the like) constituting the MEA.

The separator has the current collection function and the functions of separately supplying a fuel or an oxidizer and discharging a reaction product as well as the function of acting as a mechanical reinforcement at the time of stacking. The separator further has the function of releasing or uniformizing heat generated by power generation reaction.

Separator materials are roughly divided into carbon materials and metallic materials. As carbon materials, a piece of graphite obtained by machining a graphite block, a carbon resin molded piece, an expanded graphite molded piece, etc., exist. With such materials, there are problems described below. A graphite block is high-priced and a large number of cutting steps are required for cutting it. A carbon resin molded piece can crack easily. An expanded graphite molded piece has high gas permeability.

On the other hand, a metallic separator has high electric conductivity, thermal conductivity, mechanical strength and hydrogen gas impermeability. Further, the development mainly of a metallic separator using mainly austenitic stainless steel as a promising material on which machining for forming a channel for a raw material fluid can be easily performed and which therefore enables reducing the manufacturing cost and the thickness is being pursued. However, there is a problem that the metallic separator is low in corrosion resistance. That is, the electrolyte membrane is superacidic and the anode side is put in an oxidizing atmosphere at about 100° C. and the cathode side in a reducing atmosphere, as described above. Also, in the vicinity of the metallic separator, a reacting material and a reaction product contact and an uneven temperature distribution in the areal direction occurs. Therefore a local cell can form easily in the metallic separator and there is an extremely high risk of the metallic separator being corroded. Also, an acid produced by degradation/decomposition of the electrolyte membrane, for example, during use of the metallic separator in continuous operation for a long time further increases the possibility of corrosion. This acid not only corrodes and damages the metallic separator but also reduces the electric conductivity of the electrolyte membrane by eluted metal ions. Further, there is a problem that eluted metal ions are precipitated to reduce the performance of a precious metal catalyst such as platinum. It is, therefore, difficult to put the metallic separator into actual use.

As a means for solving these problems, a method of forming an electroconductive polymer coating on the surface of a metallic separator or a method of forming a corrosion-resisting metal coating layer such as gold or platinum plating is used. For example, patent document 1 discloses a metallic separator having a metallic base member on which a continuous channel is formed by pressing, and which is coated with a coating layer having high adhesion. According to this document, separation of the coating layer does not occur easily, and corrosion of the metallic base member can be prevented.

Patent document 2 discloses a metallic separator having an intermediate metal layer in which a flow channel can be easily formed by stamping, a corrosion-resisting metal layer provided on the outer surface of the intermediate metal layer, and a coating layer of an electroconductive agent and a resin binder formed on the surface of the corrosion-resisting metal layer. According to this document, the corrosion resistance of the metallic base member can be maintained.

Patent document 3 discloses, as an invention in an earlier application made public after the basic application for the right of priority of the present invention, a separator structure in which an electroconductive channeled plate and a metal plate are combined. Also, in patent document 3, the provision of a coating layer for preventing corrosion or for limiting the growth of a passive film over the entire surface of the metal plate or at least on the portion to be brought into contact with a meandering slot is proposed to prevent corrosion of the separator and reduce the contact resistance.

Patent document 1: Japanese Patent Application Laid-Open No. 2000-243408

Patent document 2: Japanese Patent Application Laid-Open No. 2003-272659

Patent document 3: Japanese Patent Application Laid-Open No. 2005-294155

DISCLOSURE OF THE INVENTION

However, the maintenance of the corrosion resistance during a long time has not been attained by any of the conventional methods. As a life of fuel cells for vehicle use, a life of about 5 years (about 44000 hours) is being expected. Also, as a life of fuel cells for fixed use, a life of about 10 years (about 88000 hours) is being expected. Thus, the corrosion resistance metallic separators have been a serious challenge over a long time. Measurements of the amount of elution of a metal in a sulfuric acid solution and electrode potentials have been made as a means for evaluating the corrosion resistance of a material. However, while it is possible to evaluate entire-surface corrosion, it is difficult to evaluate local corrosion such as local pitting, grain boundary corrosion or stress-corrosion cracking. In particular, it is difficult to find a sign of stress-corrosion cracking. In many cases, stress-corrosion cracking is found in a time period of several to five years after a start of use. There has been a difficulty in devising measures against it.

Stress-corrosion cracking is a corrosion phenomenon in which a crack is caused in a metallic material by interaction of tensile stress and a corrosive environment and grows with time. The cause of occurrence of this stress corrosion is concurrence of three factors: 1) a material factor (metallic material design), 2) a stress factor (the existence of residual stress, the influence of a working hysteresis), and 3) a corrosive environment factor. For example, in the case of stainless steel, corrosion occurs when the material is exposed to water containing a halogen or oxygen as a corrosion condition. This is similar to a condition for occurrence of pitting. In some cases, pitting is a starting point of stress-corrosion cracking. In a case where a carbide of chromium is precipitated at a grain boundary in a metallic material to form a chromium-deficient layer in the vicinity of the crystal grain boundary, grain boundary corrosion may occur and progress to cause stress-corrosion cracking. The conventional metallic separators are stamped mainly at the time of forming a channel. Further, the interior of a fuel cell is in a corrosive environment in which a halogen generated, for example, in a polymer coating or by decomposition of an electrolyte membrane, oxygen and water coexist. With metallic separators, therefore, there is a serious problem that stress-corrosion cracking occurs easily.

As measures against corrosion of a metallic separator, therefore, making selection of a metal strong against a use environment and coating the material with a suitable coating layer for prevention of corrosion are performed. A practical example of the coating layer is a tight organic polymer film having electric conductivity. However, electric conductivity and corrosion resistance are in a trade-off relationship and designing a coating material and improving film making techniques are one of the important challenges to be achieved.

Conventional metallic separators are stamped in a complicated manner to form a channel. Therefore, humidifying water, reaction product water, and acid produced by degradation/decomposition of the electrolyte membrane and the like stagnate easily, for example, at channel bending portions and portions of the separator and the porous supporting layer in contact with each other. These materials in the metallic separator become a cause of corrosion of the metallic separator and also become a cause of reduction in reaction efficiency. Thus, selection of a method of forming a channel for reactant gas and a metallic material has been an important challenge influencing the reactant gas flow distribution and the reaction efficiency (power generation efficiency).

The inventors of the present invention did not succeed in effectively preventing the occurrence of stress-corrosion cracking during long-time use even in the case of forming the metal plate described in the above-mentioned patent document 3.

The present invention has been achieved in consideration of these circumstances and an object of the present invention is to provide a metallic separator for fuel cells having reduced susceptibility to stress-corrosion cracking, having improved corrosion resistance and capable of maintaining the desired reaction efficiency, a method of manufacturing the metallic separator, and a fuel cell.

To achieve the above-described object, according to a first aspect of the present invention, there is provided a metallic separator for fuel cells characterized by including a metal plate, an electroconductive coating layer covering at least a surface in front and back surfaces of the metal plate which contacts a raw material and/or a reaction product, and an electroconductive channel-forming member disposed on a surface of the coating layer and forming a channel for the raw material and/or the reaction product and/or a channel for a cooling medium for cooling, the metallic separator being also characterized in that a surface layer on the metal plate has a tensile residual stress within such a range that no stress-corrosion cracking occurs.

The inventors first paid attention to reducing stress factors and material factors as a measure against stress-corrosion cracking. In particular, tensile residual stress in the surface of the metallic plate which may act as a stress factor occurs easily, for example, at the time of working the metal plate, at the time of forming the channel-forming member and at the time of assembling the cell. Therefore, there is a need to devise the composition of the coating layer, the forming method and so on for the purpose of positively reducing tensile residual stress in the surface of the metal plate.

According to this aspect a metal plate in which no groove was formed was used as a metallic separator base plate. A surface of this metallic plate was covered with a coating layer in the form of a tight polymer thin film by thermocompression. Further, a channel-forming member is separately disposed on the coating layer to form a channel.

Thus, use of a metal plate as a base plate ensures that the coating layer in the form of a tight polymer thin film can be formed by thermocompression such as hot pressing. In this way, the corrosion resistance can be largely improved while maintaining electrical conductivity (reduction of material factors). Also, since a channel-forming member separate from the metallic plate is disposed on the coating layer, a channel can be formed without requiring strong stamping which may cause metal strain (removal of a stress factor). Thus, the susceptibility to stress-corrosion cracking can be largely reduced by removing or reducing factors responsible for stress-corrosion cracking. Consequently, a metallic separator capable of being used for a long time can be provided.

In this aspect, the channel-forming member is finally formed on the coating layer and, therefore, the placement and physical properties of the channel-forming member can be changed freely. Accordingly, a channel can be designed by adjusting the porosity, water repellency and other properties of the channel-forming member on a place-by-place basis. Therefore, there is no possibility of a channel for a fuel or an oxidizer being stopped by product water, condensed water or the like, and the flow distribution of the fuel or the oxidizer can be uniformized to improve the reaction efficiency (power generation efficiency). Also, the structure of the metallic separator of the present invention is simple. Therefore, operations for manufacturing the separator, assembling a stacked-cell battery and maintenance are made easier to perform.

A second aspect is characterized in that, in the first aspect, the tensile residual stress in the surface of the metal plate is 15 kg/mm$^2$ or less.

In the second aspect, the range of a physical property of the metal plate for limiting stress-corrosion cracking is specified. Solid polymer fuel cells are ordinarily used as a stacked-cell battery in which unit cells are stacked according to an output.

Restricting tensile residual stress within the range according to the second aspect ensures that stress-corrosion cracking can be limited for a long time period even if stresses received at the time of assembly into a stacked-cell battery are added together. Tensile residual stress in the surface of the metal plate can be measured by an X-ray stress measuring method (reference document: X-ray stress measurement standards (1997 edition) published by the X-ray material strength department committee of the Society of Materials Science, Japan).

A third aspect is characterized in that, in the first or second aspect, the metal plate is a solution-heat-treated austenitic stainless steel plate.

A fourth aspect is characterized in that, in any of the first to third aspects, the metal plate is a metal formed of one or more of inconel, nickel, gold, silver and platinum, or an austenitic stainless plate plated or clad with some of these metals.

In the third and fourth aspects, the material of the metal plate is specified. The corrosion resistance of the metallic separator can be improved by using the metal according to the third and fourth aspects. In the fourth aspect, inconel is a trade name of a nickel alloy which contains chromium, iron, silicon and other elements, and which is a special alloy excellent in heat resistance, acid resistance and corrosion resistance.

A fifth aspect is characterized in that, in any of the first to fourth aspects, the coating layer and/or the channel-forming member contains a carbon-based electroconductive material and/or a polymer resin.

One of the main functions of the metallic separator is the current collection function. In the power generation reaction in the fuel cell, however, the possibility of corrosion is high because of direct exposure to strong acid atmosphere. Also, improving the efficiency of reaction requires prevention of an uneven distribution of heat. It is, therefore, necessary for the metallic separator to simultaneously have high electric conductivity, corrosion resistance and heat conductivity (heat dissipation ability).

According to the fifth aspect, each of the coating layer covering the surface of the metallic separator and the channel-forming member disposed on the coating layer contains a mixture of a polymer resin and a carbon-based electroconductive material. The carbon-based electroconductive material is an electroconductive material excellent in corrosion resistance and also excellent in terms of cost and handling. Thus, high electric conductivity can be imparted to the polymer resin by mixing the carbon-based electroconductive material in the polymer resin. Also, the corrosion resistance of the polymer resin can be improved by adding the carbon-based electroconductive material and the density can be improved by increasing the content of the polymer resin. In this way, permeation to the metal plate of a material which causes corrosion (an acid solution or the like) can be limited to improve the corrosion resistance. Since the carbon-based electroconductive material is also excellent in heat conductivity, heat conductivity can be imparted to the coating layer and to the channel-forming member, thereby uniformizing the distribution of heat in the areal direction.

A sixth aspect is characterized in that, in any of the first to fifth aspects, the carbon-based electroconductive material contained in the coating layer and the channel-forming member is one or more of graphite, carbon black, diamond-coated carbon black, silicon carbide, titanium carbide, carbon fibers and carbon nanotubes.

In the sixth aspect, the kind of the carbon-based electroconductive material contained in the coating layer and the channel-forming member is specified. The coating layer and the channel-forming member having high electric conductivity can be formed by using this carbon-based electroconductive material. As carbon black, ketjen black, acetylene black, furnace black or the like is preferred. However, these materials are not exclusively used. Also, electroconductive carbides of metals other than silicon carbide and titanium carbide can be used.

A seventh aspect is characterized in that, in any of the first to sixth aspects, the polymer resin contained in the coating layer and the channel-forming member is one or more of a phenolic resin, an epoxy resin, a melamine resin, a rubber resin, a furan resin and a polyvinylidene fluoride resin.

In the seventh aspect, the kind of the polymer resin used in the coating layer and the channel-forming member is specified. These resins are excellent in corrosion resistance and formability and also excellent in mechanical strength after forming. These resins have either thermosetting or thermoplastic characteristics, have forming temperatures proper for operations and cost, are capable of good adhesion to metals and are, therefore, markedly effective in reducing the cost and in improving the corrosion resistance.

An eighth aspect is characterized in that, in any of the fifth to seventh aspects, the carbon-based electroconductive material in the coating layer contains granular carbon and fibrous carbon and the mass ratio of the granular carbon and the fibrous carbon is within the range from 1:0.5 to 1:1.5.

In ordinary cases, the coating layer has low electric conductivity in the areal direction while having high electric conductivity in the thickness direction. In such cases, a current collection distribution occurs in the areal direction, such that the possibility of occurrence of nonuniformity of reaction and nonuniformity of distribution of heat is increased, resulting in a reduction in reaction efficiency.

In the eighth aspect, therefore, granular carbon and fibrous carbon are mixed in the polymer resin to form electric conduction paths both in the thickness and areal direction. In this way, the electric conductivity and the corrosion resistance can be improved both in the thickness direction and in the areal direction of the coating layer to improve the reaction efficiency. As granular carbon in the eighth aspect, a graphite powder or carbon black having a grain size of 1 µm or less is preferred. Also, as fibrous carbon, PAN-based or pitch-based carbon fiber having a length of 100 µm or less is preferred. However, these granular and fibrous carbons are not exclusively used.

A ninth aspect is characterized in that, in any of the fifth to eighth aspects, the coating layer contains 40 to 65 mass % of the carbon-based electroconductive material and the volume resistivity of the coating layer is 50 mΩ-cm or less.

In the metallic separator, it is preferable, from the viewpoint of securing high electric conductivity, to minimize the volume resistivity of the coating layer. The metallic separator can be reduced in thickness in comparison with carbon separators which have been put into actual use and can therefore be put to practical use if the volume resistivity of the coating layer is 50 mΩ-cm or less. It is preferable and more practical to set the volume resistivity of the coating layer to 30 mΩ-cm or less. In ordinary cases, the higher the volume resistivity of the coating layer, the higher the corrosion resistance. Therefore, the content of the resin is preferably 35 mass % or higher, more preferably 40 mass % or higher. Thus, both the desired electric conductivity and corrosion resistance can be ensured by setting the content of the carbon-based electroconductive material according to the ninth aspect.

A tenth aspect is characterized in that, in any of the first to ninth aspects, the hydrogen gas permeability of the coating layer is 10 mL$\cdot$min$^{-1}$m$^{-2}$ or less.

In the tenth aspect, the density of the coating layer is specified. Permeation to the metal plate of components which cause corrosion (a gas, a liquid) can be limited by constructing the coating layer so that the permeability is within the range according to the tenth aspect. The corrosion resistance of the metallic separator can be improved thereby. The gas permeability can be adjusted, for example, by the contents of the resin and the carbon-based electroconductive material, the kinds of the materials, forming conditions (thermocompression) and other factors. The hydrogen permeability can be measured by passing hydrogen on one side of a flat sample and analyzing hydrogen permeating to the surface on the opposite side with a gas chromatography.

An eleventh aspect is characterized in that in any of the first to tenth aspects, the coating layer is formed by thermocompression including a hot press or a hot roll.

According to the eleventh aspect, the coating layer can be formed by adhering the resin forming the coating layer to the metal plate while uniformly pressing the resin on the metal plate. At this time, gaps between portions of the carbon-based electroconductive material in the resin and gaps between portions of the resin are crushed by the pressure and heat, thereby increasing the density. Thus, permeation of a fuel or an oxidizer and a product or the like to the metal plate can be limited to improve the corrosion resistance. Further, by thermocompression, a thin film is formed with good adhesion to the metal plate. Therefore, the interfacial resistance can be reduced and separation of the coating layer can be limited. Also, because of the flat metal plate, pressing can be performed with improved uniformity along the areal direction, and metal strain due to pressing can be limited to the minimum degree. Therefore, thermocompression is applicable and a polymer having higher corrosion resistance and electric conductivity and free from defects such as pinholes and cracks can be uniformly formed into a thin film in comparison with a coating layer formed by ordinary spray coating or an immersion method.

A twelfth aspect is characterized in that, in the eleventh aspect, the thickness of the coating layer is within the range from 10 to 100 μm.

In the twelfth aspect, the range of the coating layer thickness in which the coating layer can be formed with a uniform thickness and corrosion of the flat metal plate can be limited is specified. From consideration of the reliability and safety of the metallic separator, the coating layer thickness is preferably 10 to 50 μm, more preferably 15 to 50 μm.

A thirteenth aspect is characterized in that, in any of the fifth to twelfth aspects, the channel-forming member contains 40 to 80 mass % of the carbon-based electroconductive material.

In the metallic separator, the channel-forming member forms a channel for supplying a fuel or an oxidizer or discharging a product and directly contacts the MEA to collect a current. According to the thirteenth aspect, the carbon-based electroconductive material having high electric conductivity and corrosion resistance is mixed with the polymer resin in forming. The channel-forming member having high electric conductivity and corrosion resistance can be obtained thereby. This channel-forming member is provided in the form of a frame member with a height (about 0.3 to 1 mm) according to use by forming in a mold or injection molding. The volume resistivity of the channel-forming member is preferably 10 mΩ-cm or less. Accordingly, the content of the carbon-based electroconductive material in the channel-forming member is preferably 40 mass % or more, more preferably 60 mass % or more, and further preferably in the range from 70 to 80 mass %.

Peripheral portions of the metallic separator are used as a manifold for supplying a fuel or an oxidizer to each cell and a sealing portion for separating the channel for the fuel or the oxidizer from the outside of the cell. Also, a member in which the content of the carbon-based electroconductive material is small, about 40 mass % or less, may be formed on a peripheral portion of the metallic separator in the same manner as described above.

A fourteenth aspect is characterized in that, in any of the first to thirteenth aspects, the channel-forming member is formed on the coating layer by injection molding or forming in a mold.

In many cases, during power generation reaction, product water and condensed water is produced and this product water and condensed water stop the channel for a fuel or an oxidizer to impede the reaction. According to the fourteenth aspect, the channel-forming member is formed by forming in a mold or injection molding. Therefore the adhesion to the coating layer can be improved. Also, since the channel-forming member is provided on the flat plate (on the coating layer), the size accuracy of the channel is high and the workability is high.

A fifteenth aspect is characterized in that, in any of the first to fourteenth aspects, the channel is formed by combining the channel-forming members differing in porosity from each other.

There have been cases where during power generation product water and condensed water stop the channel to reduce the reaction efficiency. In particular, a catalyst layer portion in contact with the channel-forming member is not smoothly supplied with a fuel or an oxidizer and the reaction cannot occur easily in this portion. Even if the reaction occurs in the catalyst layer portion in contact with the channel-forming member, a reaction product or the like is accumulated to cause a reduction in performance. According to the fifteenth aspect the channel-forming member has a porous or gas-permeable structure through having high permeability to water. A portion in which the porosity of the channel-forming member is a gas/liquid permeable and diffusible structure. In this high-porosity portion, supply of a fuel or an oxidizer is promoted and water locally condensed, if any, can be easily discharged by a flowing gas. Consequently, the reaction efficiency can be improved. Also, the placements of the channel-forming members on the anode side and the cathode side can be independently designed. Further, channels can be designed by combining porous members differing in porosity, gas-permeable members and non-porous members as the channel-forming members. In this way, supply of a fuel or an oxidizer to an electrode, removal of a product and supply of water to the electrolyte membrane can be easily controlled, thus enabling contribution to a reduction in size of a battery unit.

A sixteenth aspect is characterized in that, in any of the first to fifteenth aspects, the channel is formed by combining one or more of the channel-forming member having a porosity of 50% or more, the channel-forming member having a porosity of 10 to 50% and the channel-forming member having a porosity of 10% or less.

Since the channel-forming member is a member in direct contact with the MEA, it is necessary for the channel-forming member to have suitable heat conductivity.

In the sixteenth aspect, ranges of porosity enabling simultaneously obtaining the electric conductivity, heat dissipation performance and mechanical strength are specified. The channel-forming member is thereby enabled to maintain the electric conductivity, to dissipate heat accompanying power generation by diffusing the heat together with the flowing fuel or oxidizer and to thereby uniformize the distribution of heat.

Since the channel-forming member has pores, the elasticity of the channel-forming member is improved and the adhesion between the MEA and the separator can also be improved. Thus, excessive mechanical stress applied to the MEA and the metal plate can be reduced.

A seventeenth aspect is characterized in that, in the sixteenth aspect, the channel-forming member is one or more of porous carbon-based electroconductive materials: carbon particle sintered material, carbon fiber sintered material, carbon fiber woven fabric and carbon fiber nonwoven fabric, and the channel-forming member is joined to the coating layer.

In the seventeenth aspect, concrete kinds of channel-forming member are specified. A channel having high electric conductivity and corrosion resistance can be easily formed by using the porous carbon-based electroconductive member according to the seventeenth aspect even in a case where the channel-forming member contains no resin. Preferably, the porosity of the porous electroconductive member in the seventeenth aspect is 50% or more. The carbon-based porous material may be joined by a bonding material resin or may be joined only by a mechanical force.

To achieve the above-described object, according to an eighteenth aspect of the present invention, there is provided a metallic separator for fuel cells characterized in that a channel for a raw material and/or a reaction product and/or a channel for a cooling medium for cooling is formed by forming on a metal plate an electroconductive coating layer covering at least a surface in front and back surfaces of the metal plate which contacts the raw material and/or the reaction product, and thereafter forming the metal plate on which the coating layer is formed.

According to the eighteenth aspect, a more uniform and tighter coating layer can be formed in comparison with the case of forming a channel by directly stamping a metal plate and thereafter forming a coating layer thereon. In this way, the occurrence of stress-corrosion cracking under the influence of stamping can be reduced. Hydroforming is preferred as a forming method.

A nineteenth aspect is characterized in that, in the eighteenth aspect, a tensile residual stress in the surface of the metal plate is 15 kg/mm$^2$ or less.

In the nineteenth aspect, tensile residual stress in the surface of the metal plate can be measured by an X-ray stress measuring method (reference document: X-ray stress measurement standards (1997 edition) published by the X-ray material strength department committee of the Society of Materials Science, Japan).

A twelfth aspect is characterized in that in the eighteenth or nineteenth aspect the metal plate is a solution-heat-treated austenitic stainless steel plate.

A twenty-first aspect is characterized in that, in the eighteenth to twelfth aspects, the metal plate is a metal formed of one or more of inconel, nickel, gold, silver and platinum, or an austenitic stainless plate plated or clad with some of these metals.

A twenty-second aspect is characterized in that in any of the eighteenth to twenty-first aspects, the coating layer contains a carbon-based electroconductive material and/or a polymer resin.

A twenty-third aspect is characterized in that, in the twenty-second aspect, the carbon-based electroconductive material in the coating layer contains granular carbon and fibrous carbon and the mass ratio of the granular carbon and the fibrous carbon is within the range from 1:0.5 to 1:1.5.

A twenty-fourth aspect is characterized in that in any of the eighteenth to twenty-third aspects, the hydrogen gas permeability of the coating layer is 10 mLmin$^{-1}$m$^{-2}$ or less.

A twenty-fifth aspect is characterized in that, in any of the eighteenth to twenty-fourth aspects, the coating layer is formed by thermocompression including a hot press or a hot roll.

A twenty-sixth aspect is characterized in that, in any of the eighteenth to twenty-fifth aspects, the thickness of the coating layer is within the range from 20 to 100 μm.

According to a twenty-seventh aspect, a fuel cell is constructed by sandwiching a cell having a cathode catalyst layer on one surface of a polymer electrolyte membrane and an anode catalyst layer on the other surface of the polymer electrolyte membrane between a first separator in which a channel for flowing a fuel to the anode catalyst layer is formed and a second separator in which a channel for flowing an oxidizer to the cathode catalyst layer is formed, and is characterized in that the metallic separator for fuel cells according to any one of the first to twenty-sixth aspects is used as each of the first separator and the second separator.

The fuel cell according to the twenty-seventh aspect is based on an application of the metallic separator of the present invention. The corrosion resistance of stacked-cell battery can be improved thereby to enable long-time operation. In the twenty-seventh aspect, separators each having a channel in one face are used as the first and second separators at opposite ends of a stacked-cell battery. At inner positions other than the opposite ends, the flat faces of a pair of metallic separators (opposite from the fuel or oxidizer channel formation surfaces) are opposed to each other and a cell cooling structure may be inserted therebetween if necessary.

In this cell cooling structure, a channel through which a cooling medium is caused to flow can be formed, as in the above-described method of forming a channel for a fuel or an oxidizer. With respect to a cell not requiring a cooling medium channel, it is preferable in terms of cost to form, for the functions of the first and second separators, a bipolar structure in which an anode channel is formed in one face of one metal plate having two surfaces covered with the coating layer, and in which a cathode channel is formed in the other face of the metal plate.

The metallic separator of the present invention can be applied to fuel cells using, as a fuel, hydrogen gas, a modified gas and a liquid fuel such as alcohol. For example, it can be applied to a polymer electrolyte fuel cell (PEFC) and a direct methanol fuel cell (DMFC). Since the metallic separator is thinner than the conventional carbon separator, it enables a stacked-cell battery to be reduced in size. The cell in the eighteenth aspect represents an MEA in which an anode catalyst layer is joined to one surface of a polymer electrolyte membrane and a cathode catalyst layer is joined to the other surface of the polymer electrolyte membrane.

To achieve the above-described object, according to a twenty-eighth aspect of the present invention, there is provided a method of manufacturing the metallic separator for fuel cells according to any one of the first to seventeenth aspects, characterized by forming the channel for the raw material and/or the reaction product and/or the channel for the cooling medium for cooling by forming the electroconductive coating layer on at least a surface in the front and back surfaces of the metal plate which contacts the raw material and/or the reaction product and by thereafter disposing the one or more electroconductive channel-forming members on the surface of the coating layer.

In the twenty-eighth aspect, a method of manufacturing the metallic separator of the present invention is specified to remove or reduce factors responsible for stress-corrosion cracking (by using a metal plate not stamped and forming a coating layer in the form of a tight polymer thin film on a surface of the metal plate). By this method, a metallic separator in which the susceptibility to stress-corrosion cracking is markedly reduced and which is capable of use for a long time can be provided.

Disposing the channel-forming member on the coating layer enables the quality and physical properties of the channel-forming member and the channel design to be changed according to use. Therefore the flow distribution of a fuel or an oxidizer can be uniformized to improve the reaction efficiency.

The channel for a cooling medium for cooling can be formed in the same manner as the channel for a fuel or an oxidizer. A cooling medium channel may be directly formed in the face opposite from the face in which a fuel or oxidizer channel is formed or may be formed in the surface of another metallic separator. Since the structure of the metallic separator of the present invention is simple, operations for manufacturing the separator, assembling a stacked-cell battery and maintenance can be easily performed.

A twenty-ninth aspect is characterized in that, in the twenty-eighth aspect, the coating layer is formed by adhering a coating layer forming liquid, a coating layer forming powder or a coating layer forming sheet containing a carbon-based electroconductive material and a polymer resin to the surface of the metal plate by thermocompression including a hot press or a hot roller.

According to the twenty-ninth aspect, it is preferable to form the coating layer as a tight thin film having a thickness of 10 to 100 μm by a thermocompression using a hot press, or a hot roll or the like for pressing the surface while heating the same. More preferably, the coating layer is formed to a thickness of 10 to 50 μm. By pressing the coating layer, carbon fibers or carbon particles are brought into close contact with each other and aligned together to improve the bonding between the carbon fibers or particles. The volume resistivity is thereby reduced. Also, air bubbles in the resin layer, and gaps between the resin and carbon fibers are reduced, thereby obtaining a tight coating layer. From this, a corrosion prevention effect on the metal plate provided as a base can be expected.

Thermocompression according to the present invention can be adopted because the base plate is flat. Also, a polymer having higher electric conductivity and free from defects such as pinholes can be uniformly formed into a thin film in comparison with a coating layer formed by ordinary spray coating or an immersion method. Therefore, permeation to the metal plate of a material which causes corrosion can be limited to prevent corrosion. Further, the same compressive stress as that in the case of shot-peening can be given, so that the susceptibility to stress-corrosion cracking can be reduced.

A thirtieth aspect is characterized in that, in the twenty-eighth or twenty-ninth aspect, the channel-forming member is formed by forming a channel forming liquid or a channel forming powder containing a carbon-based electroconductive material and a polymer resin on the coating layer by injection molding or forming in a mold to provide the channel for the raw material and/or the reaction product and/or the channel for the cooling medium for cooling.

In the thirtieth aspect, a method of forming the channel-forming member is specified, thereby enabling formation of a channel with improved bonding to the coating layer. The channel-forming member may be separately made and thereafter disposed on the coating layer as desired by in mechanical contact therewith.

To achieve the above-described object, according to a thirty-first aspect of the present invention, there is provided a method of manufacturing the metallic separator for fuel cells according to any one of the eighteenth to twenty-sixth aspects, characterized in that the channel for the raw material and/or the reaction product and/or the channel for the cooling medium for cooling is formed by forming on the metal plate the electroconductive coating layer covering at least a surface in the front and back surfaces of the metal plate which contacts the raw material and/or the reaction product, and thereafter forming the metal plate on which the coating layer is formed.

In the thirty-first aspect, hydroforming is preferred as a forming method.

A thirty-second aspect is characterized in that, in the thirty-first aspect, the coating layer is formed by adhering a coating layer forming liquid, a coating layer forming powder or a coating layer forming sheet containing a carbon-based electroconductive material and a polymer resin to the surface of the metal plate by thermocompression including a hot press or a hot roller.

According to the thirty-first and thirty-second aspects, a more uniform and tighter coating layer can be formed in comparison with the case of forming a channel by directly stamping a metal plate and thereafter forming a coating layer thereon. In this way, the occurrence of stress-corrosion cracking which can be easily caused in a bending portion by stamping or the like can be reduced.

According to the present invention, as described above, a metallic separator for fuel cells having reduced susceptibility to stress-corrosion cracking and excellent corrosion resistance can be obtained to enable maintenance of the desired reaction efficiency.

BRIEF DESCRIPTION OF THE DRAWINGS

FIGS. 7(a) to 7(c) are schematic diagrams showing the process of manufacturing the metallic separator in the second embodiment;

FIG. 8 is a perspective view showing the entire construction of a polymer fuel cell according to the present invention;

DESCRIPTION OF SYMBOLS

Figure 1A:
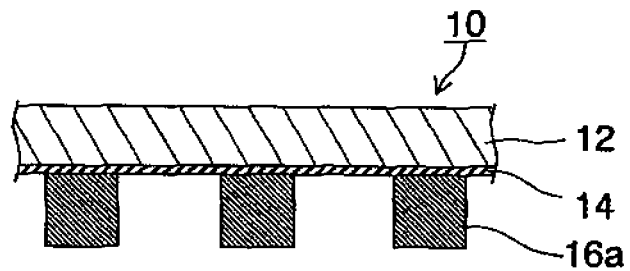
FIG. 1(a) is a partial sectional view of a metallic separator used in opposite end portions of a stacked-cell battery, in metallic separators in a first embodiment.

10 Metallic separator
50 Metallic separator
12 Metal plate
14 Coating layer
16a Rib
16b Rib
16w Rib
17 Channel
24 Polymer resin
26 Polymer resin
34 Electroconductive material
36 Electroconductive material
40 Hydraulic forming apparatus
42 Lower mold
44 Upper mold
50A Anode-side channel formation face (metallic separator)
50C Cathode-side channel formation face (metallic separator)
52 Metal plate
54 Coating layer
56a Nonporous rib
56b Gas-permeable rib
56c Porous rib
55 Fuel supply manifold
55' Oxidizer supply manifold
57 Fuel discharge manifold
57' Oxidizer discharge manifold
58 Gasket
40 MEA
56d Porous rib (carbon paper)
100 Polymer electrolyte fuel cell (PEFC)

BEST MODE FOR CARRYING OUT THE INVENTION

Preferred forms of implementation a metallic separator for fuel cells, a manufacturing method and a fuel cell according to the present invention will be described with reference to the accompanying drawings.

(First Embodiment)

The present embodiment is an example of a metallic separator in which a channel is formed by using a channel-forming member without pressing a metal plate.

Figure 1B:
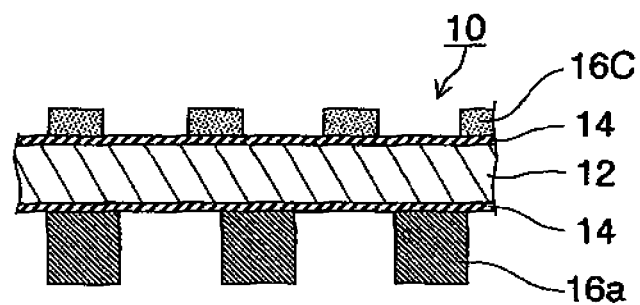
FIG. 1(b) is a partial sectional view of a metallic separator used in an inner portion of a stacked-cell battery, in the metallic separators in the first embodiment.
Figure 1C:
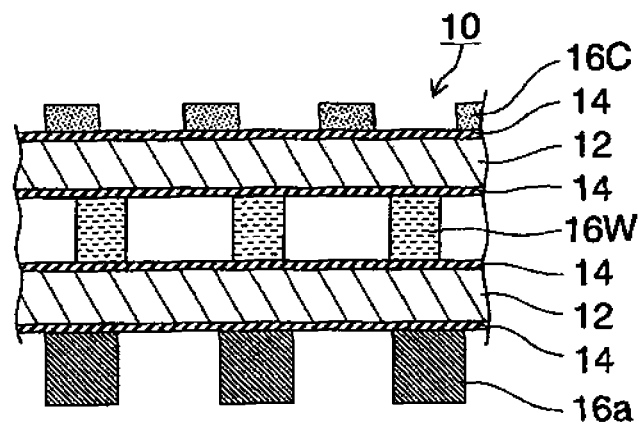
FIG. 1(c) is a partial sectional view of a metallic separator used in an inner portion of a stacked-cell battery, in the metallic separators in the first embodiment.
Figure 1D:
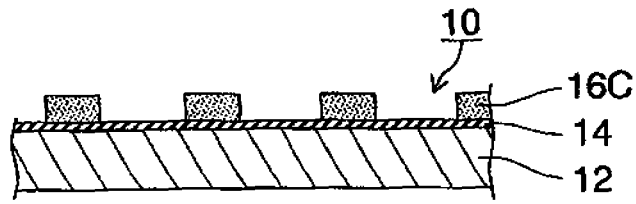
FIG. 1(d) is a partial sectional view of a metallic separator in opposite end portions of a stacked-cell battery, in the metallic separators in the first embodiment.

The construction of the metallic separator in the present embodiment will first be outlined. FIG. 1 are schematic sectional views of metallic separators 10 for fuel cells in several patterns. In FIG. 1, FIGS. 1(a) and 1(d) are partial sectional views of metallic separators 10 used in opposite end portions of a stacked-cell battery. FIGS. 1(b) and 1(c) are partial sectional views of metallic separators 10 used in inner portions of the stacked-cell battery. In these figures, FIG. 1(c) is a partial sectional view of a metallic separator 10 having a cooling structure. FIG. 2 are partial schematic views for explaining members constituting FIG. 1. In the figures, the same reference characters denote the same objects or the same functions.

The metallic separator 10 in FIG. 1(a) or 1(d) showing a basic construction of the metallic separator according to the present invention has a metal plate 12 formed of a metallic material having high electric conductivity (e.g., stainless steel or a nickel alloy), a coating layer 14 covering one surface of the metal plate 12, and ribs 16a provided as channel-forming members disposed on the coating layer 14 to form a channel for a fuel or ribs 16c provided as channel-forming members forming a channel for an oxidizer (ribs 16a or ribs 16c in the following). Referring to FIG. 1(a) or 1(d), it is preferable, from the viewpoint of increasing the corrosion resistance, to also form a coating layer 14 on the surface on which no ribs 16a or ribs 16c are formed.

Similarly, the metallic separator 10 in FIG. 1(b) has coating layers 14 covering opposite surfaces of one metal plate 12, ribs 16a disposed on the surface of one of the coating layers 14, and ribs 16c disposed on the surface of the other coating layer 14. Further, the metallic separator 10 in FIG. 1(c) has, between a pair of metal plates 12 covered with coating layers 14, a cooling structure formed of ribs 16w forming a channel through which a cooling medium (cooling water or the like) is caused to flow.

The metal plate 12 is a metal in the form of a plate having a suitable mechanical strength, high electric conductivity and excellent corrosion resistance. As metallic materials having such properties, an austenitic stainless steel plate, a metal formed of at least one of inconel, nickel, gold, silver and platinum and a member plated or clad with some of these metals and other materials may be mentioned. However, the metal plate 12 is not limited to these. The metal plate 12 undergoes a solution heat treatment. Preferably, the metal plate 12 has a tensile residual stress of 15 kg/mm$^2$ or less after the solution heat treatment. The possibility of stress-corrosion cracking resulting from residual stress in the metal plate 12 can be reduced thereby.

The coating layer 14 is a protective layer for preventing corrosion of the metal plate. For corrosion resistance, a tight film having no defects such as pin holes and cracks, having good adhesion to the base plate and having a constant uniform thickness is required.

Figure 2A:
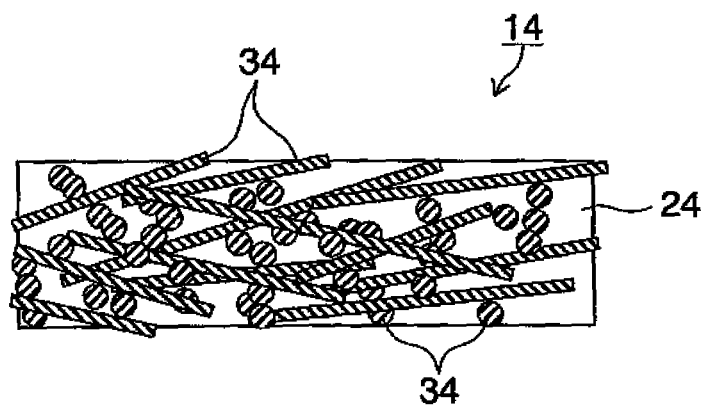
FIG. 2(a) is a schematic partial view showing a section of the structure in a coating layer of the metallic separator in the first embodiment.
Figure 2B:
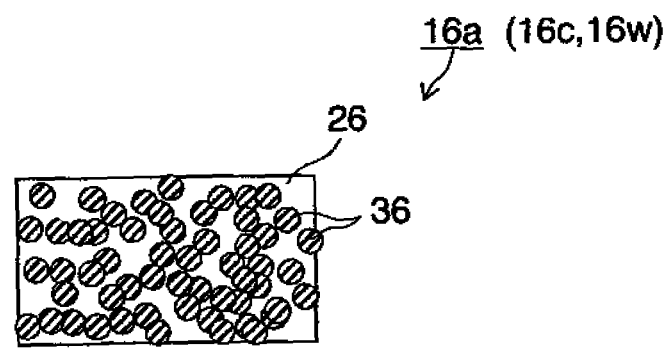
FIG. 2(b) is a schematic partial view showing a section of the structure in a rib of the metallic separator in the first embodiment.

FIG. 2(a) is a schematic diagram showing an section in the coating layer 14. The coating layer 14 has a matrix of a polymer resin 24 in which an electroconductive material 34 in granular and fibrous forms (carbon-based conductive material) is uniformly dispersed. FIG. 2(b) is a schematic diagram showing a section in the ribs 16a, 16c, and 16w. In the ribs 16a, 16c, and 16w, an electroconductive material 36 in granular form is uniformly dispersed in a matrix of a polymer resin 26, as is that in the coating layer 14. As the polymer resin 26 and the electroconductive material 36, the same materials as the polymer resin 24 and the electroconductive material 34 used in the coating layer 14 may be used.

FIG. 2(b) is particularly a schematic structural diagram in a case where graphite powder 36 in single granule form and thermoplastic resin 26 having excellent flowability are used at the time of forming ribs by injection molding. In a case where ribs are formed by injection molding, however, the material of the ribs may be the same as that in FIG. 2(a) if only the desired flowability can be secured. In a case where ribs are formed by forming in a mold, and the material of the rib is not limited by the presence of fluidity.

The polymer resin 24 is mainly for imparting corrosion resistance to the coating layer 14 and is adhered to the metal plate 12. More specifically, one or more of a phenolic resin, an epoxy resin, a melamine resin, a rubber resin, a furan resin and a polyvinylidene fluoride resin can be preferably used.

The electroconductive material 34 is mainly for imparting high electric conductivity to the coating layer 14. In the present embodiment, the electroconductive material in granular and fibrous forms (carbon-based electroconductive material) is uniformly dispersed in the polymer resin to form an electric conduction path. It is effective to use the electroconductive material in either of granular and fibrous forms.

Preferably, the electroconductive material 34 is a carbon-based electroconductive material excellent in terms of electric conductivity, dispersibility, cost and handling. As the carbon-based electroconductive material, one or more of graphite, ketjen black, acetylene black, furnace black, carbon black, diamond-coated carbon black, silicon carbide, titanium carbide, carbon fibers and carbon nanotubes can be preferably used. As the electroconductive material 34, not only the carbon-based electroconductive material but also a metal oxide, a nitride, a boride or the like can also be used.

The coating layer 14 is formed by plastically deforming and pressing a coating layer forming agent (a coating layer forming solution, a coating layer forming powder or a coating layer forming sheet) containing the polymer resin 24 and the electroconductive material 34 at a temperature equal to or higher than the softening point of the polymer resin 24 or in a setting temperature range (thermocompression). Concrete examples of this thermocompression are hot pressing, hot rolling and the like. In this way, by a compression force, carbon fibers or carbon particles are brought into contact with each other and densely arrayed together to improve bonding between the carbon fibers or carbon particles, thereby reducing the volume resistivity. Also, air bubbles in the resin layer and gaps between the resin and the carbon fibers or carbon particles are reduced, so that the tight coating layer 14 can be obtained.

The ribs 16a or 16c are members forming a channel through which a fuel or an oxidizer is supplied or discharged in the metallic separator 10. Also, the ribs 16a and 16c establish electrical connection between the MEA and the coating layer 14 and regulate the flow distribution of the fuel or the oxidizer and product water, condensed water or the like.

The ribs 16w are members forming a channel through which a cooling medium (cooling water or the like) is supplied and discharged with efficiency. The ribs 16w are provided as a cooling structure for temperature control in a stacked-cell battery in correspondence with each unit cell or each of groups of unit cells each consisting of several unit cells.

As shown in FIGS. 1(a) to 1(d), the ribs 16a and 16c are disposed in the form of frame members with a height of about 0.3 to 1 mm on the coating layer 14. Electrical connections and the ribs which regulate the flow distribution of the fuel or the oxidizer and product water, condensed water or the like may coincide with each other or may be provided separately from each other. For example, electrical connections in the form of columns may be disposed uniformly on the entire area, and the peripheral ribs and the ribs forming an inner gas passage may be arranged like Dashboards separately from the electrical connections. If the base plate of the metallic separator is flat as in the present invention, an arrangement setting of ribs can be freely made. Therefore, the degree of freedom with which the rib structure is designed can be increased and the reaction efficiency can be improved. The present embodiment has been described with respect to an example in which the channel sectional shape formed by the ribs 16a, 16b, and 16w is rectangular. However, the present invention is not limited to this. The channel may be trapezoidal in section.

Ribs differing in porosity may be provided according to the arrangement of the MEA. Transmission and diffusion of the fuel or the oxidizer and product water, condensed water or the like through the ribs are thereby facilitated to improve the reaction efficiency. Porous ribs having a porosity of 50% or higher are permeable both to a gas and to a liquid. Gas-permeable ribs having a porosity of 10 to 50% are permeable to a gas. If the porosity is 5% or less, the heat conductivity (heat dissipation ability) is reduced. Thus, local accumulation of heat can be effectively avoided by a suitable porosity. It is also effective to increase the porosity of the ribs 16a and 16c on the downstream side where water can condense easily, depending on the arrangement of the MEA. Also, the water repellency of the ribs 16 on the downstream side may be increased to facilitate discharge of a mass of water. Also, it is effective to increase the flow rate by reducing the distance between the ribs 16a or 16c adjacent to each other on the downstream side in facilitating discharge of water. The reaction efficiency can be maintained in this way. It is also possible to impart elasticity to the ribs 16a, 16c, and 16w by including a foaming agent in the raw material resin. Mechanical impacts applied to the metal plate 12 and the MEA can be reduced by doing so. As another form of use of porous ribs, a method may be adopted in which the width of a rib is increased and the fuel or the oxidizer and product water, condensed water or the like are forced to flow through the rib from one edge of the rib toward another edge of the rib (refer to FIG. 10 described below). Fast supply of the fuel or the oxidizer to the MEA in contact with the rib and fast discharge of reaction products are thereby enabled to improve the reaction efficiency. Thus, since the ribs are formed on the flat base plate, the size accuracy is high and the workability and joinability to the coating layer for manufacture can be improved.

The ribs 16a, 16c, and 16w are formed by forming in a mold or injection molding performed by flowing a channel forming liquid containing the polymer resin 26 and the electroconductive material 36 directly onto the coating layers 14 and setting the liquid. In this way, channels can be formed with good joinability to the coating layers 14. The ribs 16a, 16c, and 16w may alternatively be formed separately and disposed mechanically on the coating layers 14 or by thermocompression (hot pressing or the like).

The process of manufacturing the metallic separator will be described with reference to FIGS. 3(a) to 3(e).

Figure 3A:
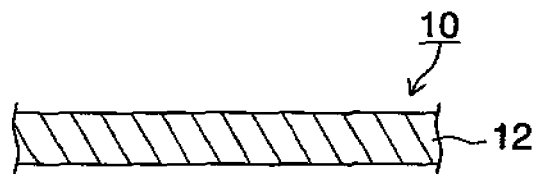
FIGS. 3(a) to 3(e) are schematic diagrams showing the process of manufacturing the metallic separator in the first embodiment.

First, referring to FIG. 3(a), the metal plate 12 is solution heat treated to be formed into a predetermined shape.

Figure 3B:
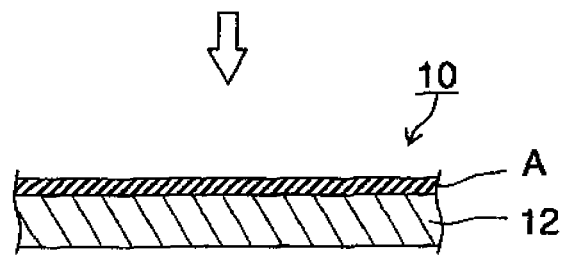

Subsequently, as shown in FIG. 3(b), a coating layer forming agent A having the electroconductive material 34 distributed in the polymer resin 24 is applied in film form on the surface of the solution-heat-treated metal plate.

Figure 3C:
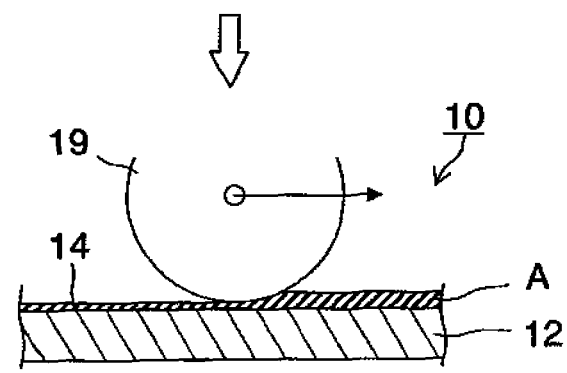

Subsequently, as shown in FIG. 3(c), the entire surface of the applied coating layer forming agent A is thermocompression-formed with a hot roller 19 to form the coating layer 14 in the form of a tight polymer thin film.

Figure 3D:
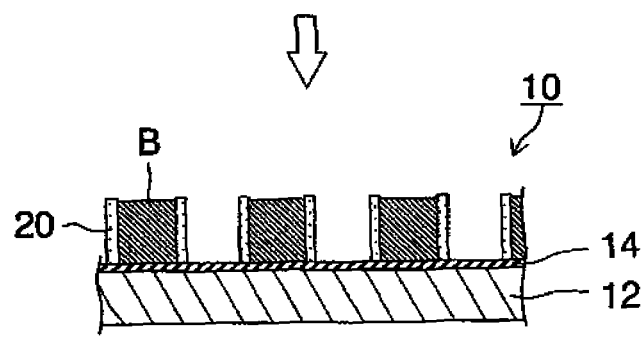

Thereafter, as shown in FIG. 3(d), a channel forming solution B (or a channel forming powder B) having the electroconductive material 36 distributed in the polymer resin 26 is poured (or packed) on the surface of the coating layer 14 by injection molding or forming in a mold (a mold 20 in FIG. 3) and is set.

Figure 3E:
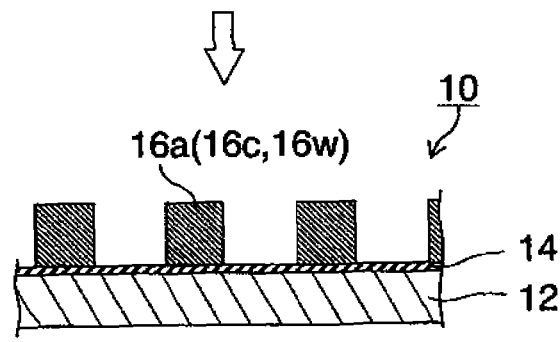

As shown in FIG. 3(e), the mold 20 is removed to form a channel between the ribs.

The metallic separator 10 excellent in corrosion resistance can be manufactured by such a simple method and arrangement.

The results of studies on the design of the members: the metal plate 12, the coating layer 14 and the ribs 16a, 16c, and 16w will be described below.

1) Metal Plate (Stress-Corrosion Cracking Susceptibility)

A study of the influence of stamping on two materials: austenitic stainless steels SUS302 and SUS304L for the metal plate 12, having general versatility and actually used under various atmospheres for a long time was planned. Rolled members of SUS302 and SUS304L were solution heat treated by performing water quenching from 1,100° C. by which a solid solution of a carbide is produced. Stress-corrosion cracking susceptibility was thereafter measured.

As test pieces, a test piece A and a test piece B not stamped were prepared, as shown in Table 1. As test pieces for comparison, a test piece C and a test piece D in which a groove having a depth of 1 mm and a width of 2 mm was formed by stamping, i.e., pressing with a die, were prepared.

A testing method was carried out in which the test pieces A to D were immersed in a boiling 42-mass % magnesium chloride solution for 10 hours and the state of corrosion of a surface and a section was examined by observation with an optical microscope and a scanning electron microscope.

TABLE 1

| Test piece | Stainless base plate | Stamping | Remark |
|---|---|---|---|
| A | SUS302 | Undone | Grain boundaries were slightly corroded but there was no corrosion cracking. |
| B | SUS304L | Undone | No change (no corrosion) |
| C | SUS302 | Done | Cracking occurred along grain boundaries. |
| D | SUS304L | Done | In-grain cracking occurred in the vicinity of ridgeline portions |

As shown in Table 1, SUS302 test piece A was slightly corroded at grain boundaries after immersion in the boiling 42-mass % magnesium chloride solution for 10 hours, but no pitting or cracking was recognized. On the other hand, no changes were recognized in SUS304L test piece B. It was found that the corrosion resistance of SUS304L test piece B was higher than that of SUS302 test piece A. In SUS302 test piece C for comparison in which a longitudinal groove was formed, grain boundary corrosion and cracking along the grain boundary starting from the grain boundary corrosion occurred. In SUS304L test piece D for comparison, no grain boundary corrosion occurred but in-grain cracking occurred in the vicinity of bent ridgeline portions. It was thereby found that this test piece had stress-corrosion cracking susceptibility. The tensile residual stress in the portion where cracking occurred due to stamping was 20 kg/mm$^2$ or more, and it was confirmed that portions in which the tensile residual stress was 15 kg/mm$^2$ or less did not crack. From these results, it was found that forming of the channel without stamping according to the present invention made it possible to largely reduce the susceptibility to stress-corrosion cracking.

2) Coating Layer (Corrosion Resistance)

A study was made on the relationship between the corrosion resistance of the coating layer, the thickness of the coating layer, the content of the carbon-based electroconductive material and the coating layer forming method.

The corrosion resistance of the coating layer was evaluated by measuring the state of occurrence of corrosion current through alternating current impedance. That is, the coating layer was formed on the surface of stainless steel and a current-potential curve was measured by cyclic voltammetry (hereinafter referred to as CV measurement) while blowing in air in 1-mol sulfuric acid solution. The sweep rate was set to 10 mV (vsRHE)/sec and an oxidation-reduction current (corrosion current) in oxide film generated at about 600 mV (vsRHE) was detected. Subsequently, the coating layer surface was observed with a microscope. Thereafter, the metal plate was removed to leave the coating layer in the form of a 0.5 mm-thick plate, and the hydrogen gas permeability was directly measured with a gas chromatograph.

A study on the corrosion resistance of the polymer layer (epoxy resin in the present embodiment) in the single state not containing the electroconductive material was first made. That is, a test of the relationship between the resin layer thickness, the forming method and the corrosion resistance (corrosion current) was conducted.

In the resin layer formed only by a coating method, the corrosion current did not became 100 μA or less when the thickness of the resin layer is smaller than 100 μm. On the other hand, in the resin layer formed by hot pressing (thermocompression), no corrosion current was observed and only a double-layer charge current to the resin layer flowed when the thickness of the resin layer was 20 μm or more. That is, it was found that in the case where the resin layer was formed by hot pressing, the thickness of the layer when sufficient corrosion resistance was exhibited was smaller than in the case of forming the resin layer only by the coating method. From this, it was found that air bubbles and gaps in the epoxy resin were reduced by hot pressing the resin layer to enable tightly forming the resin layer.

A study on the corrosion resistance in a case where the carbon-based electroconductive material was added to the epoxy resin was next made. That is, the corrosion current was measured by the same method as that described above with respect to the coating layer of the epoxy resin to which 40 to 70 mass of carbon particles having an average primary particle size of 300 nm and an average secondary particle size of about 1 μm were added, and which was formed on the stainless steel surface. Test pieces a to e shown in Table 2 were provided. Test piece e in these test pieces was prepared for comparison between forming methods by being applied with a sponge roll and heated at 180° C. for 30 minutes.

TABLE 2

| Test piece | Amount of resin (mass %) | Amount of carbon (mass %) | Film thickness (μm) | Peak corrosion current (μA/cm$^2$) | Remark |
|---|---|---|---|---|---|
| a | 30 | 70 | 15~20 | >50 | Hot pressing |
| b | 40 | 60 | 10~15 | ≈0 | Hot pressing |
| c | 50 | 50 | 10~15 | ≈0 | Hot pressing |
| d | 60 | 40 | 10~15 | ≈0 | Hot pressing |
| e | 50 | 50 | 30~50 | >100 | Roll application |

As shown in Table 2, it was found that in the case where the coating layer was formed by hot pressing, substantially no corrosion current flowed and the corrosion resistance was good when the amount of the resin containing carbon particles was in the range from 40 to 60 mass % while the thickness of the coating layer was 10 to 15 μm. This result shows that the corrosion resistance was two times or more higher than that in the above-described case of the resin in the single state. Thus, in the present embodiment, sufficient corrosion resistance is exhibited when the thickness of the carbon particle/epoxy resin coating layer is 10 to 50 μm. From consideration of the reliability and safety of the separator, however, it is preferable to set the thickness to 15 to 50 μm.

Figure 4:
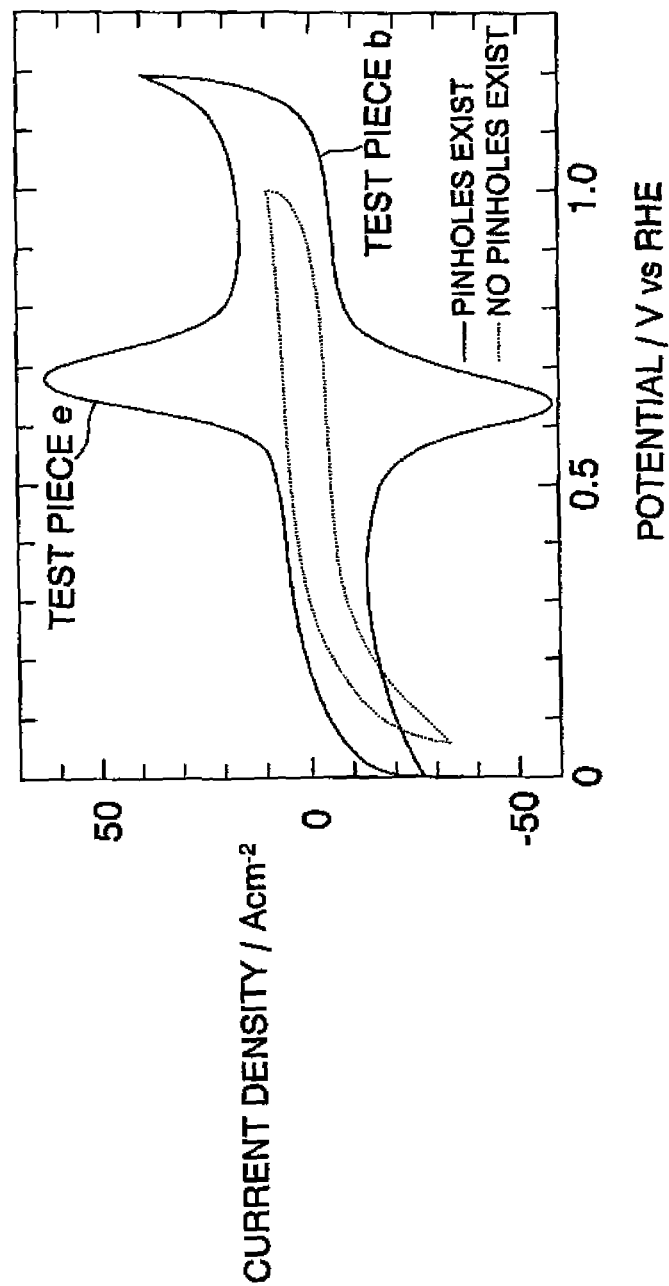
FIG. 4 is a graph showing a cyclic voltammogram (current-voltage curve) of an epoxy resin/carbon coating layer.

FIG. 4 shows the results of CV measurement in this study. FIG. 4 shows current-potential curves with respect to the test piece b formed by hot pressing and the test piece e formed with the sponge roll.

In the case of the test piece b, the current detected during potential sweep from 0.1 V to 1 V (vsRHE) was within a restricted range of −500 to 20 µA and no corrosion current, water decomposition current or the like was observed. As a result of close observation of the surface of the test piece b after the measurement, no change was recognized.

Figure 5:
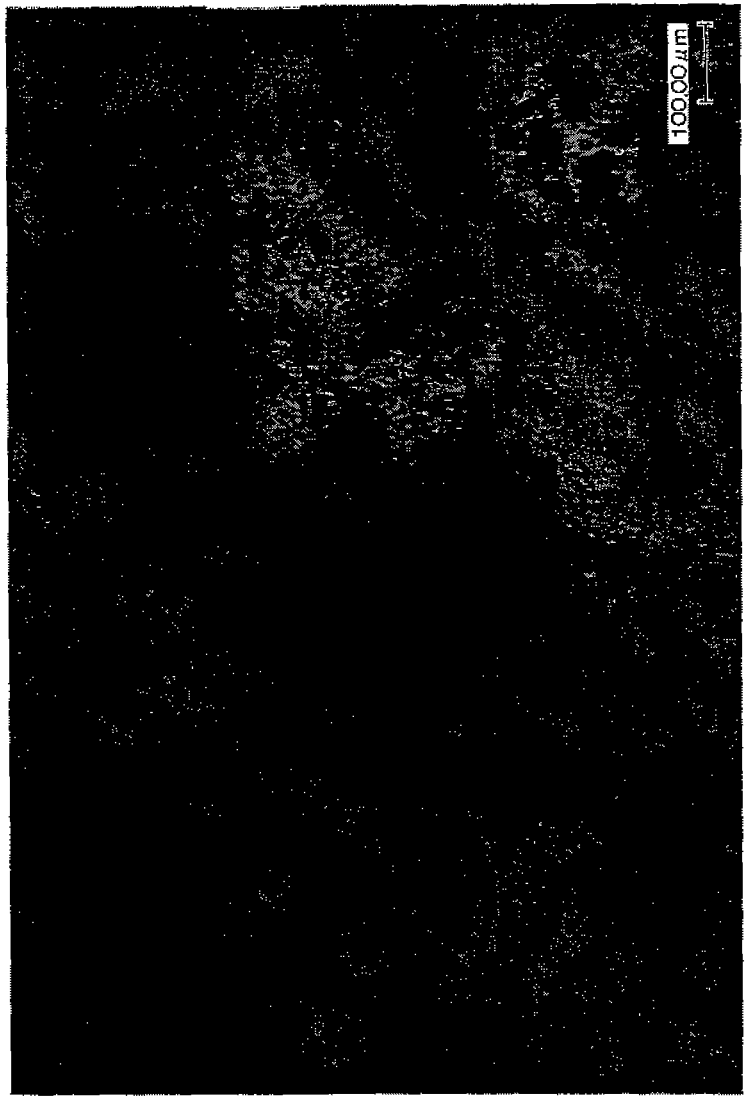
FIG. 5 is a scanning-electron-microscopic image of the epoxy resin/carbon coating layer after CV measurement.

In the case of the test piece e, a current considered due to the decomposition of the passive film or anodic dissolution was detected at about 800 mV (vsRHE). After CV measurement, the coating layer surface of the coating layer/SUS304 test piece e was observed with a scanning electron microscope. As a result of this observation, the existence of pinholes such as shown in FIG. 5 in the surface of the coating layer and a change in color of portions around the pinholes accompanying the elution of the metal were recognized. It was confirmed from this result that corrosion occurred in the test piece e.

It was confirmed that as a result of use of hot pressing (thermocompression) sufficient corrosion resistance was exhibited even when the thickness of the coating layer is small.

3) Coating Layer and Ribs (Shape and Kind of Electroconductive Material)

Selections from electroconductive materials for the coating layer (and ribs) were next made. As the electric conductivity of the coating layer, the volume resistivity of the coating layer was measured by a planar direction four-terminal method. The volume resistivity was measured by interposing each test piece (coating film) between two metallic plates and maintaining the test piece in a pressed state and by using an alternating current impedance method. It is preferable to minimize the volume resistivity. However, carbon-based materials were selected by using a practical value of 30 mΩ-cm or less as a guide. Kinds of carbon-based electroconductive material are shown below.

f. Carbon fibers: 1 µm in outside diameter, 150 µm in length g. Nanotubes: 60 to 80 nm in outside diameter, about 100 µm in length h. acetylene black: 40 nm in average primary particle size, 1 to 2 µM in aggregate average particle size, 70 m²/g in specific surface area i. ketjen black: 30 nm in average primary particle size, 1 µM in aggregate average particle size, 1300 m²/g in specific surface area j. 75 mass % of carbon fibers+25 mass % of acetylene black k. 75 mass % of carbon fibers+25 mass % of ketjen black l. Graphite fine powder particles:

Coating films in a single state of 15 to 20 µm were made by using an epoxy resin as the polymer resin, adding the carbon-based electroconductive materials of specimens f to k described above and performing thermocompression. Table 3 shows the amount of addition of the carbon-based electroconductive materials when a volume resistivity of 30 mΩ-cm was exhibited and the amount of addition of the carbon-based electroconductive materials when a volume resistivity of 20 mΩ-cm was exhibited.

TABLE 3

| Specimen | 50 mΩ-cm Addition amount | 30 mΩ-cm Addition amount | Unit: mass % 20 mΩ-cm Addition amount |
|---|---|---|---|
| f | 35 | 40 | 45 |
| g | 40 | 50 | 55 |
| h | 55 | 60 | 70 |
| i | 45 | 50 | 55 |
| j | 25 | 35 | 35 |
| k | 30 | 35 | 40 |
| l | 65 | 70 | 80 |

As shown in Table 3, in the case where the carbon-based electroconductive material prepared by mixing 25 mass % of acetylene black or ketjen black with carbon fibers, as in specimens j and k, was used, a volume resistivity of 30 mΩ-cm or less was obtained when the amount of addition was the smallest, 35 mass %. On the other hand, in the case where the carbon-based electroconductive material was acetylene black or ketjen black in a single state, as represented by specimens h and i, obtaining a volume resistivity of 30 mΩ-cm or less required addition of 50 to 60 mass % of the carbon-based electroconductive material. It was found that mixing carbon fibers in the coating layer made it possible to reduce the amount of addition of the electroconductive material, as described above.

Ketjen black is porous, has a high degree of crystallization, exists mixedly among carbon fibers entwining each other to improve electrical contacts between the carbon fibers, thereby forming a stable electric conduction path. Since the carbon in fibrous form is oriented along the areal direction of the coating layer, it improves the electric conductivity in the areal direction. Thus, the electric conductivity can be improved both in the thickness direction and in the areal direction by mixing ketjen black in granular form and fibrous carbon in the coating layer. In this way, the current density distribution in the MEA surface can be made more uniform to improve the reaction efficiency.

The coating film formed by applying the same carbon fibers as specimen f with a sponge roll (application method) and heating at 180° C. for 30 minutes exhibited a volume resistivity of 30 mΩ-cm when 50 mass % of carbon fibers were added. That is, in the case where the coating film is not processed by thermocompression, about a 10 mass %-larger amount of carbon fibers is required for obtaining a volume resistivity of 30 mΩ-cm or less. It is, therefore, supposed that the electric conductivity is low in this case. Accordingly, it is thought that the coating film formed by hot rolling has increased electric conduction paths thanks to the mechanical action (pressing action) at the time of thermocompression to obtain high electric conductivity in comparison with the coating film formed with a sponge roll.

If a larger amount of electroconductive material is added to the coating film, the amount of resin is reduced and pinholes are formed to increase the possibility of corrosion such as that in the test piece e shown in Table 2. The thermocompression method according the present invention enables the coating film to have high electric conductivity while limiting the amount of addition of the electroconductive material (without reducing the amount of the resin) and, therefore, the coating film also becomes excellent in corrosion resistance.

While the present embodiment has been described with respect to the coating layer, it is also preferred that the ribs also have high electric conductivity, corrosion resistance and heat conductivity. The same material as that of the coating layer may be used for the ribs. However, it is supposed that the effectiveness of the electric conductivity in the areal direction is not as high as that of the coating layer because the rib width is small in ordinary cases. Therefore, mixing granular carbon and fibrous carbon is not necessarily required. The electric conductivity can be improved by increasing the content of carbon-based electroconductive material.

(Second Embodiment)

The present embodiment is an example of a metallic separator having a channel formed by first forming a coating layer on a surface of a metal plate and thereafter forming the plate molding.

Figure 6A:
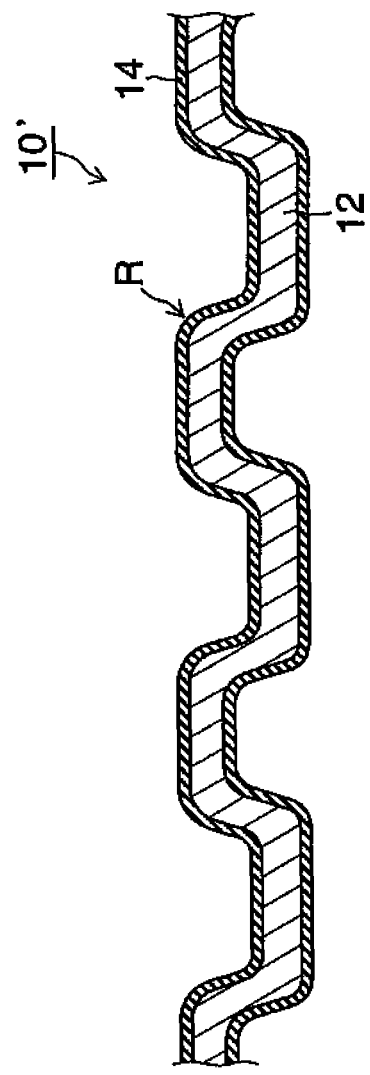
FIG. 6(a) is a partial sectional view of a metallic separator in a second embodiment in a case where a bending portion in a channel section is rounded.
Figure 6B:
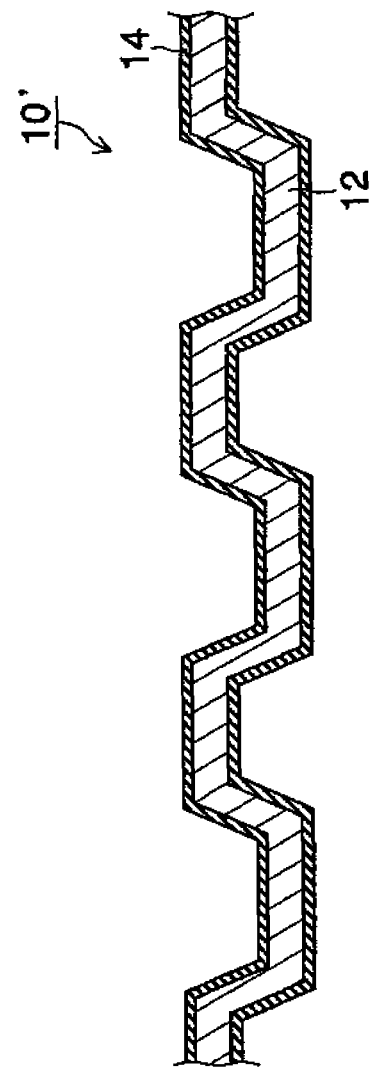
FIG. 6(b) is a partial sectional view of a metallic separator in the second embodiment in a case where a bending portion in a channel section is not rounded.

FIG. 6 are partial sectional views of a metallic separator 10' for fuel cells in the present embodiment. In FIG. 6, FIG. 6(a) shows a case where a bent portion in a channel section is rounded and FIG. 6(b) shows a case where a bent portion in a channel section is not rounded. FIG. 7 are schematic diagrams for explaining an example of manufacture of the metallic separator 10' in the present embodiment. In the diagrams, the same reference characters as those in FIGS. 1 to 5 for the first embodiment denote the same objects or functions. The same descriptions of the same objects or functions as those for the first embodiment will not be repeated.

The metallic separator 10' in the present embodiment is formed in the same manner as the metallic separator in the first embodiment except that, as shown in FIG. 6, a channel is formed not by a channel-forming member but by forming a metal plate 12 having a coating layer 14 formed on its surface, and that the channel has such a sectional shape that local stress concentration is limited.

As shown in FIG. 6(a), tensile residual stress in the metallic separator 10' can be reduced by forming bending portions having curved surfaces (rounded). In the metallic separator 10' shown in FIG. 6, the channel sectional area can be increased.

As the materials for the metal plate 12 and the coating layer 14 constituting this metallic separator 10', various treatments (e.g., a heat treatment on the metal plate 12), the method of forming the coating layer, and so on, the same materials, treatments and method, and so on as those in the first embodiment can be used.

The metallic separator 10' can be manufactured as described below.

First, the coating layer 14 is formed on the surface of the metal plate 12 by the same method as that shown in FIGS. 3(a) to 3(c) for the first embodiment.

Next, a hydraulic forming apparatus 40 (hydroforming apparatus) is prepared which has, as shown in FIG. 7, a lower mold 42 corresponding to the inversion of the projecting/recessed shape of a channel, an upper mold 44 set so as to be opposed to the lower mold 42 through the metal plate 12 and a pressing rubber bag 46 in which pressing oil L is injected to press the metal plate 12 in the space between the lower mold 42 and the upper mold 44.

Subsequently, the metal plate 12 is set and fixed between the upper mold 44 with the pressing rubber bag 46 and the lower mold 42.

Subsequently, pressing oil L at about 200° C. is injected from injection piping 49 provided in the upper mold 44 into the pressing rubber bag 46 to bend the metal plate 12 having the coating layer 14 formed on its surface, thereby forming channels 17 on the opposite sides. Air existing between the metal plate 12 and the upper mold 44 is exhausted from exhaust piping 47 connected to an exhaust pump 45 through a valve 48.

Thus, forming is gradually performed by uniformly applying the pressure of pressing oil L to the entire surface of the metal plate 12, so that local stress concentration can be avoided.

The metallic separator 10' having the channels 17 formed thereon is then removed from the hydraulic forming apparatus 40.

The metallic separator 10' in the present embodiment can be made by the above-described method. The method of manufacturing the metallic separator 10' in the present embodiment is not limited to that described above. Any other method may suffice if local stress concentration can be reduced.

Processing for removing tensile residual stress may be performed after taking the metallic separator 10' out of the hydraulic forming apparatus 40.

In the present embodiment, if coating layers are formed on the two surfaces of the metal plate 12, the same coating layer forming operation as that described above may also be performed on the back surface of the metal plate 12. Also, the coating layers may be simultaneously formed with two rolls opposed to each other, with the metal plate 12 interposed therebetween. It is preferable to set the thickness of the coating layer within the range from 20 to 100 μm from the viewpoint of reliably reducing stress-corrosion cracking under the influence of forming of the metal plate 12.

As described above, the tight coating layer is formed on the surface of the metal plate before forming of the metal plate. Therefore the coating layer can be formed more uniformly and tightly at bending portions in a channel cross section in comparison with the case where the coating layer is provided after pressing the metal plate. Further, since the channel is formed by using the forming method that limits local stress concentration, the occurrence of stress-corrosion cracking in the metallic separator can be limited.

EXAMPLES

Examples of the present invention will be described below. The present invention is not limited to the examples described below. A power generation test of a polymer-electrolyte fuel cell using the metallic separator 10 in the first embodiment of the present invention was performed.

The construction of the polymer electrolyte fuel cell 100 will first be described. FIG. 8 is a perspective view showing the unit-cell construction of a polymer electrolyte fuel cell 100. This fuel cell 100 has a structure in which a pair of metallic separators 50 of the present invention are placed above and below an MEA (membrane electrode assembly) 40 so that the MEA is in contact with and tightly pinched between the metallic separators 50. The metallic separator 50 has an anode-side channel formation face 50A formed in its upper face and has a cathode-side channel formation face 50C formed in its lower face. The structure of the cathode-side channel formation face 50C is substantially the same as that of the anode-side channel formation face 50A. Therefore the illustration and description of it are partially omitted. The members indicated by reference characters having the same end numerals are identical to each other or have the same functions.

In the anode-side channel formation face 50A of the metallic separator 50, the surface of a metal plate 52 is covered with a coating layer 54 and a plurality of ribs are provided on the coating layer 54 to from channels. The ribs include a nonporous rib 56a impermeable to a gas/liquid such as a fuel or an oxidizer, a gas-permeable rib 56b permeable to a gas, and a porous rib 56c permeable to a gas/liquid. The anode-side channel formation face 50A of the metallic separator 50 is sealed at its peripheral end with a gasket 58 made of silicon resin to prevent a fuel, an oxidizer or the like from leaking out of the system. Hydrogen gas supplied from a fuel supply manifold 55 flows in the directions of arrows to flow into an upper portion on the MEA 40 anode catalyst layer side. The remainder passes through the central porous rib 56c to be recovered through a fuel discharge manifold 57.

On the other hand, in the cathode-side channel formation face 50C of the metallic separator 50, the elements are formed in the same manner as those described above; the surface of the metal plate 52 is covered with a coating layer and a plurality of ribs (not shown) are provided on the coating layer to from channels. Oxygen gas entering from an oxidizer supply manifold 55' flows in channels formed by the ribs to be supplied to the MEA 40 cathode catalyst layer side, and a reaction product and the remainder are discharged through an oxidizer discharge manifold 57'.

Conditions for making each member will next be described.

The metal plate 52 was formed by stamping a 0.1 mm-thick SUS304L plate into a predetermined shape and was heat-treated in a reducing furnace at a temperature of 1,100° C. A material for the coating layer 54 prepared by adding 30 mass % of ketjen black and 25 mass % of carbon fibers to 45 mass % of a high-temperature-setting-type epoxy resin was sufficiently mixed in a ballmill. Thereafter the coating layer 54 was formed on the SUS304L plate by using a hot press so that the average thickness was 20 μm. This coating layer 54 was a tight thin film having a volume resistivity of 15 mΩ-cm.

On the surface of the coating layer 54, 0.5 mm-thick ribs set with carbon fibers and the epoxy resin were disposed. On the back surface (the cathode-side channel formation face 50C) of the metal plate 52 having coating layers 54 formed on its two surfaces, 0.7 mm-thick ribs for an oxidizer were extruded with a mold at 120° C. and set at 180° C. to form channels for the oxidizer. The through resistivity of the ribs was 5 mΩ-cm or less. The porosity of the porous rib 56c was about 70%, while the porosity of the gas-permeable rib 56b was about 50%.

The MEA 40 was made by disposing an anode electrode and a cathode electrode made by TKK (the amount of supported Pt: 0.5 mg/cm$^2$) on each of the two surfaces of a solid electrolyte membrane on the market (Nafion112: trademark) and by using a hot press. The MEA 40 was then sandwiched between a pair of separators 50, thus assembling a unit cell.

The temperature of the unit cell was set to 70° C. and the amount of humidification of hydrogen gas to be supplied to the anode side was adjusted by changing the humidification temperature of a humidifying device. Hydrogen gas (hydrogen utilization rate $U_{H2}$=70%) and pure oxygen or air (oxygen utilization rate Uair, $U_{O2}$=40%) were respectively supplied to the unit cell at ordinary pressure. The power generation characteristic when air was used as oxidizer gas is plotted in FIG. 9, as indicated by ▲. In a case where the current density was 0.5 A/cm$^2$, the initial voltage was 0.68 V. This value is substantially equal to or higher by about 10 mV than the voltage of the cell having ribs of the conventional type. It was found that the voltage drop in a higher-current-density region was smaller and stabler than that in the conventional cell.

Figure 9:
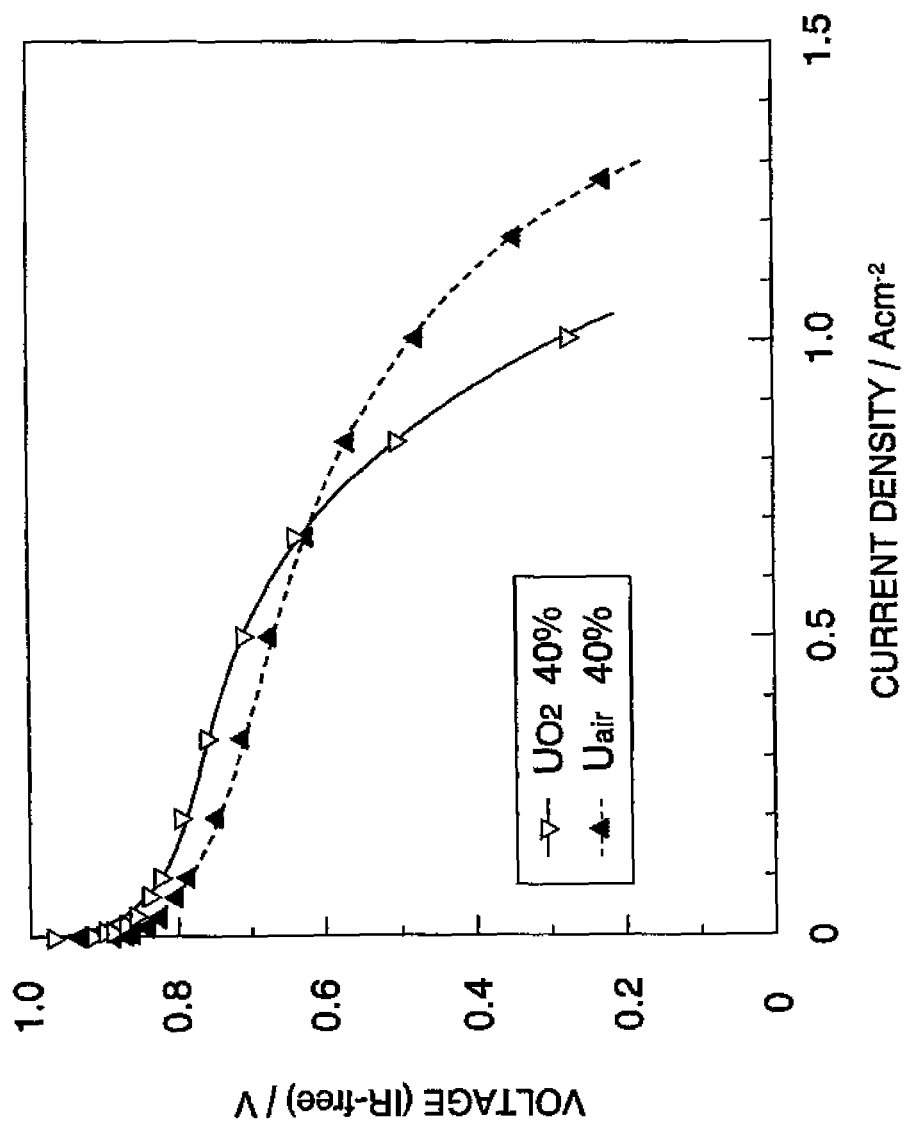
FIG. 9 is a graph of power generation characteristics in an example of the present invention.

Plotting ∇ in FIG. 9 indicates the case of using pure oxygen as oxidizer gas. In a lower-current-density region, at a current density of 0.5 A/cm$^2$, a voltage higher by about 25 mV than that in the case of using air as oxidizer gas was exhibited due to the high oxygen concentration. In a higher-current-density region where the current density is 0.7 A/cm$^2$ or higher, however, this power generation characteristic was reversed and a voltage higher by 0.2 V was obtained at a current density of 1 A/cm$^2$ in the case of using air as oxidizer gas.

In the higher-current-density region, the flow rate of the fuel or oxidizer is reduced because of a larger amount of reaction, and the operation is in a supply-limited state. Nevertheless, the power generation characteristic in the higher-current-density region in the case of using pure oxygen as oxidizer gas was, for example, a current density of 0.8 A/cm$^2$ even in use of the same MEA, and a voltage higher by 50 mV than that in the cell having ribs of the conventional type.

It is therefore thought that the reason that the voltage is stabilized in the higher-current density region even when air having a low oxygen concentration is used is because hydrogen gas, humidifying water and oxygen are sufficiently supplied into the catalyst layers in the MEA by permeating through the porous rib or gas-permeable rib, and because the product water is sufficiently removed.

It was also confirmed that even when the amount of humidification was increased by increasing stepwise the humidification temperature in the range from 60 to 90° C., the voltage was not substantially changed and there was no stagnation of water in the MEA 40 face. This is because the flowability of the gas/liquid in the ribs was improved. Further, this is thought since the metal plate and the coating layer were extremely thin (<0.2 mm) and had flat surfaces, high heat conductivity was obtained and heat of condensation produced at the time of movement of anode-side water into the electrolyte membrane and heat of reaction produced by the reaction resistance of the cathode were efficiently utilized for evaporation removal of water produced at the cathode.

Figure 10A:
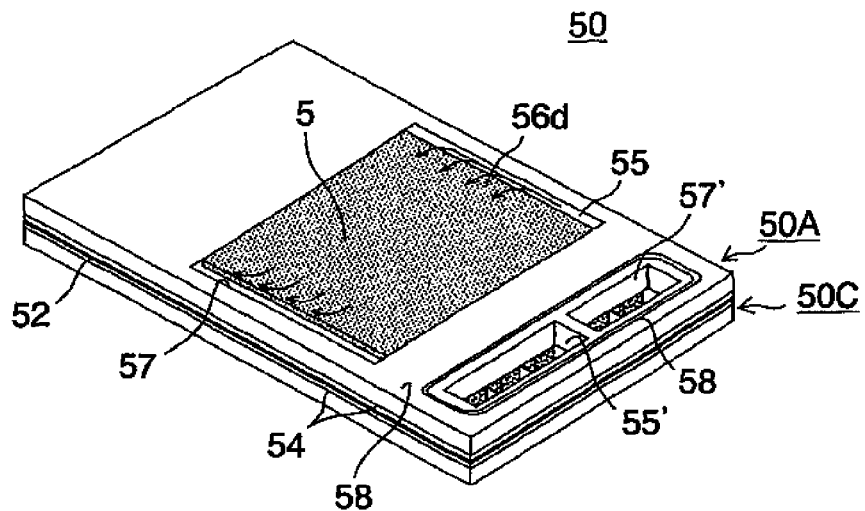
FIG. 10(a) is a perspective view showing an anode-side face of a metallic separator for a direct methanol fuel cell according to the present invention.
Figure 10B:
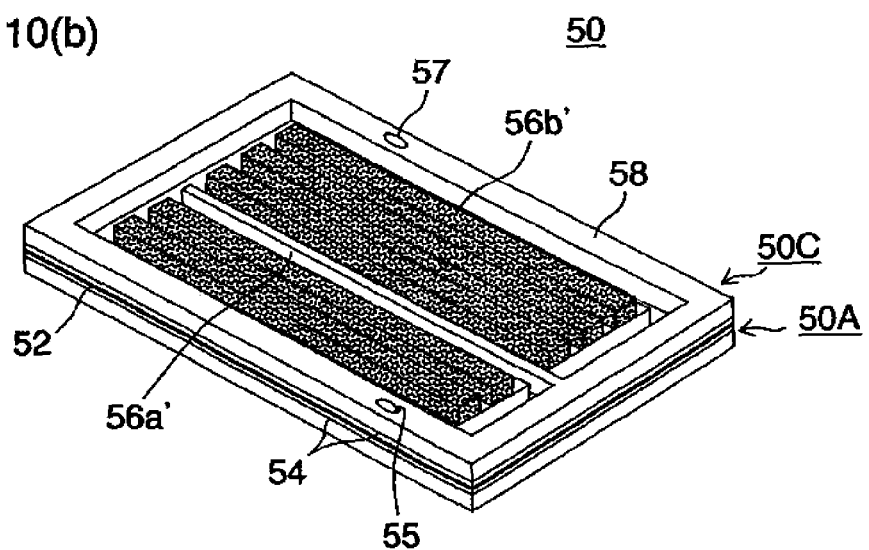
FIG. 10(b) is a perspective view showing a cathode-side face of the metallic separator for a direct methanol fuel cell according to the present invention.
Figure 10C:
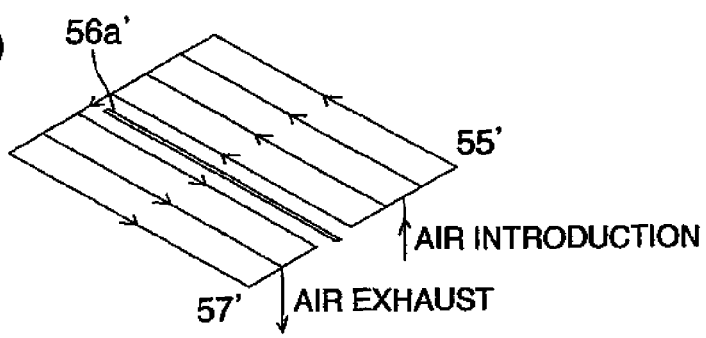
FIG. 10(c) is a schematic diagram showing a the flow of air in the cathode-side face of the metallic separator for a direct methanol fuel cell according to the present invention.

FIG. 10 show a metallic separator 50 for a direct methanol fuel cell (DMFC) to which the present invention was applied. One face of this metallic separator 50 is an anode-side channel formation face 50A shown in FIG. 10(a), and the other face is a cathode-side channel formation face 50C shown in FIG. 10(b), thus forming a bipolar structure. FIG. 10(c) is a diagram for explaining the flow of air on the cathode side shown in FIG. 10(b). The members indicated by the same reference characters as those in FIG. 8 are the same members or have the same functions.

The direct methanol fuel cell is supplied with a methanol aqueous solution (hereinafter referred to as "methanol fuel") provided as a fuel instead of hydrogen gas, at the anode side in Example 1. The electrode reaction at this time is shown below.

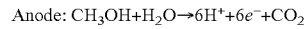
Anode: $CH_3OH + H_2O \rightarrow 6H^+ + 6e^- + CO_2$

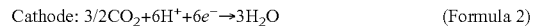
Cathode: $3/2CO_2 + 6H^+ + 6e^- \rightarrow 3H_2O$ (Formula 2)

Thus, this fuel cell differs from the polymer electrolyte fuel cell shown in FIG. 8 mainly in that a methanol fuel in liquid form is supplied to the anode, and that carbon dioxide gas is produced as a reaction product.

The structure of the metallic separator 50 on the anode side in FIG. 10, not particularly illustrated, is substantially the same as that of the polymer electrolyte fuel cell 100 shown in FIG. 8 except mainly that a channel is formed by a porous rib 56d on a wide surface adjacent to the MEA, and that the porosity of the porous rib 56d exceeds 70% (ribs in the form of rods are formed on the metallic separator 50 on the cathode side in the same manner as shown in FIG. 8, and no description will be made of them). As a special example of the channel structure on the anode side, a structure in which the width of the porous rib 56d is increased to fill the entire channel as described above may be adopted.

In the anode-side channel formation face 50A, the methanol fuel is forcibly supplied from the fuel supply manifold 55 side by a fluid feed pump, not shown in the figure, or the like. The methanol fuel then flows in the porous rib 56d (70%<porosity, carbon paper used as the porous rib 56d in the present embodiment) to be supplied to the MEA not shown in the figure. The remainder of the methanol fuel and a reaction product (carbon dioxide gas, or the like) are discharged through a discharge port 57. The methanol fuel is forcibly supplied through the porous rib 56d to be uniformly and efficiently supplied to the entire catalyst layer of the MEA not shown in the figure. The produced carbon dioxide gas is also diffused efficiently in the porous rib 56d to be discharged.

The occurrence of a phenomenon in which carbon dioxide gas stops the channel to impede supply of the methanol fuel as in the conventional cell is thus prevented and the methanol fuel can be caused to diffuse uniformly over the entire reaction surface. The reaction efficiency can therefore be improved.

If the MEA size is large, the basic structure constituted by the porous rib 56d, the fuel supply manifold 55 and the fuel discharge manifold 57 may be formed on a plurality of metallic separators. Thus, the fuel can be uniformly supplied to the entire reaction surface.

In the cathode-side channel formation face 50C, gas-permeable ribs 56' can be used, as in the polymer electrolyte fuel cell 100. In particular, it is thereby ensured that oxygen can be supplied to the catalyst layer even in the portions where the MEA contacts the ribs, and that product water can be removed with efficiency. Also, an arrangement in which four channels are reduced to three channels from the air upstream side to the air downstream side as shown in FIGS. 10(b) and 10(c) is adopted to increase the flow rate, thereby promoting discharge of product water, condensed water and a reaction product or the like.

Also, a nonporous rib 56a' may be provided in the channel on the downstream side to improve the gas flow rate in the channel on the downstream side in which the oxygen concentration is reduced, thereby enabling quick removal of water or any other material capable of stopping the channel. The reaction efficiency can therefore be improved.

Also, the corrosion resistance of a metallic separator can be improved by applying the metallic separator according to the first embodiment of the present invention. Therefore, in the direct methanol fuel cell in particular, corrosion of the metal plate 52 by an intermediate product (formaldehyde, formic acid, methyl formate, or the like) produced in the process of oxidation reaction of the methanol fuel can be limited. Thus, even under such a strict corrosive environment, the metallic separator can be used for a long time. Since the metallic separator can be reduced in thickness in comparison with the conventional carbon separator, it enables stacked cells to be further reduced in size. Therefore, the entire size of a battery unit including micro-fuel cells and an auxiliary piece of equipment (such as a fuel or an oxidizer supply pump) can be reduced and the possibility to application of fuel cells to portable appliances can be increased.

While the present example has been described with respect to an example in which a nonporous rib is used as a portion of a channel, it may alternatively function as a gasket housing. The channel shape is not limited to that in the present example. Any other channel such as a channel dotted with ribs in land form, a meandering channel or a straight channel may be formed.

While the present example has been described with respect to an example in which the fuel in liquid form is methanol, the present invention can also be applied to fuel cells using other organic fuels (ethanol, isopropanol and the like).

Thus, the first embodiment of the present invention is adopted to enable forming of a channel without stamping and to thereby limit stress-corrosion cracking. Also, a tight coating layer can be formed by thermocompression and, therefore, the corrosion resistance of the metallic separator can also be improved. Further, the physical properties and placement of a rib constituting a channel can be freely changed. Therefore, supply/discharge of a fuel or an oxidizer/products and the like and supply/dissipation of heat can be uniformized, thereby largely improving the reaction efficiency (power generation efficiency) of the polymer electrolyte fuel cell.

Industrial Applicability

The present invention can be applied to fuel cells which use a polymer electrolyte, and which are used mainly as power sources for use on vehicles, fixed use (home use), and use in portable appliances such as portable telephones and note PCs.

The invention claimed is:

1. A method of manufacturing a metallic separator for fuel cells, said method comprising, in the following order:
   forming a channel for a raw material and/or a reaction product and/or a channel for a cooling medium for cooling by forming a corrosion-resistant coating layer having a matrix of a polymer resin in which a carbon-based conductive material is uniformly dispersed on at least one surface of front and back surfaces of an unpressed metal plate of austenitic stainless steel which contacts the raw material and/or the reaction product, and by thereafter
   disposing one or more electroconductive channel-forming members on a surface of the coating layer,
   wherein a surface layer of the metal plate has tensile residual stress within such a range that no stress-corrosion cracking occurs,
   wherein the electroconductive channel-forming members are formed directly on a surface of the coating layer opposite to a surface that contacts the metal plate,
   wherein the coating layer is formed by adhering a coating layer forming liquid, a coating layer forming powder or a coating layer forming sheet containing a carbon-based electroconductive material and a polymer resin to the surface of the metal plate by thermocompression including a hot press or a hot roller, and
   wherein a density of the coating layer is increased by the thermocompression.

2. The method of manufacturing a metallic separator for fuel cells according to claim 1, characterized in that the coating layer is formed by thermocompression including a hot press or a hot roll.

3. The method of manufacturing a metallic separator for fuel cells according to claim 2, characterized in that the thickness of the coating layer is within the range from 10 to 100 µm.

4. The method of manufacturing a metallic separator for fuel cells according to claim 2, characterized in that the channel-forming member contains a carbon-based electroconductive material or a carbon-based electroconductive material and a polymer resin, wherein the channel-forming member contains 40 to 80 mass % of the carbon-based electroconductive material.

5. The method of manufacturing a metallic separator for fuel cells according to claim 1, characterized in that the channel-forming member is formed on the coating layer by injection molding or forming in a mold.

6. The method of manufacturing the metallic separator for fuel cells according to claim 1, characterized in that the channel-forming member is formed by forming a channel forming liquid or a channel forming powder containing a carbon-based electroconductive material and a polymer resin on the coating layer by injection molding or forming in a mold to provide the channel for the raw material and/or the reaction product and/or the channel for the cooling medium for cooling.

7. The method of manufacturing a metallic separator for fuel cells according to claim 1, wherein the channel is formed by combining one or more channel-forming members selected from the group consisting of channel-forming members having a porosity of 50% or more, channel-forming members having a porosity of 10 to 50%, and channel-forming members having a porosity of 10% or less.

8. A method of manufacturing a metallic separator for fuel cells, said method comprising:

- preparing an unpressed metal plate of austenitic stainless steel, a surface layer of which steel has tensile residual stress within such a range that no stress-corrosion cracking occurs;
- forming a corrosion-resistant coating layer having a matrix of a polymer resin in which a carbon-based conductive material is uniformly dispersed directly on at least one surface of front and back surfaces of the unpressed metal plate of austenitic stainless steel which contacts a raw material and/or a reaction product; and
- forming a channel for the raw material and/or the reaction product and/or a channel for a cooling medium for cooling by disposing one or more electroconductive channel-forming members on a surface of the corrosion-resistant coating layer;
- wherein the coating layer is formed by thermocompression and a density of the coating layer is increased by the thermocompression.

* * * * *